(12) United States Patent
Haghighat et al.

(10) Patent No.: US 12,185,290 B2
(45) Date of Patent: *Dec. 31, 2024

(54) METHODS AND APPARATUS FOR FLEXIBLE APERIODIC SRS TRANSMISSION

(71) Applicant: InterDigital Patent Holdings, Inc., Wilmington, DE (US)

(72) Inventors: Afshin Haghighat, Ile-Bizard (CA); Paul Marinier, Brossard (CA); Janet Stern-Berkowitz, Little Neck, NY (US); Moon Il Lee, Melville, NY (US); Patrick Tooher, Montreal (CA); Young Woo Kwak, Woodbury, NY (US); Nazli Khan Beigi, Longueuil (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,714

(22) Filed: May 3, 2024

(65) Prior Publication Data
US 2024/0292388 A1   Aug. 29, 2024

Related U.S. Application Data

(63) Continuation of application No. 18/013,797, filed as application No. PCT/US2021/041075 on Jul. 9, 2021.
(Continued)

(51) Int. Cl.
*H04W 72/0446* (2023.01)
*H04L 1/00* (2006.01)
(Continued)

(52) U.S. Cl.
CPC ....... *H04W 72/0446* (2013.01); *H04L 1/0061* (2013.01); *H04L 5/0051* (2013.01); *H04W 72/23* (2023.01)

(58) Field of Classification Search
CPC .............. H04W 72/0446; H04W 72/23; H04L 1/0061; H04L 5/0051
See application file for complete search history.

(56) References Cited

U.S. PATENT DOCUMENTS

| | | | |
|---|---|---|---|
| 2019/0190582 A1 | 6/2019 | Guo et al. | |
| 2021/0212101 A1 | 7/2021 | Jiang et al. | |
| 2023/0179358 A1* | 6/2023 | Gao | H04L 5/0053 370/329 |

FOREIGN PATENT DOCUMENTS

| | | | | |
|---|---|---|---|---|
| CN | 116600391 A | * | 8/2023 | ............... H04B 7/01 |
| EP | 3471327 A1 | | 4/2019 | |

OTHER PUBLICATIONS

Interdigital, Inc., "Further Details on SRS Enhancements", 3GPP Tdoc R1-2108813, 3GPP TSG RAN WG1 #106b-e, e-Meeting, Oct. 11-19, 2021, 10 pages.

(Continued)

*Primary Examiner* — Melvin C Marcelo
(74) *Attorney, Agent, or Firm* — Flaster Greenberg, P.C.

(57) ABSTRACT

Method, apparatus, and systems for flexible aperiodic reference signal (RS) transmissions are provided. For example, a method implemented in a wireless transmit/receive unit (WTRU) for wireless communications comprises receiving configuration information of one or more sounding reference signal (SRS) resource sets, each SRS resource set of the one or more SRS resource sets is associated with a slot offset and a set of slot offset deltas; receiving downlink control information (DCI) indicating an SRS request, the SRS request indicates an SRS resource set of the one or more SRS resource sets; determining an SRS configuration from a set of SRS configurations for SRS transmissions; determining a slot for transmitting an SRS based on the determined SRS configuration; and transmitting, in the determined slot, the SRS using resources of the indicated SRS resource set.

16 Claims, 12 Drawing Sheets

Related U.S. Application Data

(60) Provisional application No. 63/049,932, filed on Jul. 9, 2020, provisional application No. 63/091,597, filed on Oct. 14, 2020, provisional application No. 63/169,974, filed on Apr. 2, 2021.

(51) Int. Cl.
*H04L 5/00* (2006.01)
*H04W 72/23* (2023.01)

(56) References Cited

OTHER PUBLICATIONS

Interdigital, Inc., "Enhanced SRS Transmission and Antenna Switching", 3GPP Tdoc R1-2102437, 3GPP TSG RAN WG1 #104b-e, e-Meeting, Apr. 12-20, 2021, 10 pages.

Interdigital, Inc., "Discussion on SRS Enhancements", 3GPP Tdoc R1-2007631, 3GPP TSG RAN WG1 #103-e, e-Meeting, Oct. 26-Nov. 13, 2020, 6 pages.

Interdigital, Inc., "Discussion on SRS Enhancements", 3GPP Tdoc R1-2100068, 3GPP TSG RAN WG1 #103-e, e-Meeting, Jan. 25-Feb. 5, 2021, 8 pages.

Interdigital, Inc., "Remaining Issues on SRS Enhancements", 3GPP Tdoc R1-2106645, 3GPP TSG RAN WG1 #106e, e-Meeting, Aug. 16, 2021, 11 pages.

3rd Generation Partnership Project; Technical Specification Group Radio Access Network; NR; Physical layer procedures for data (Release 16), 3GPP TS 38.214 V16.1.0, Mar. 2020, 151 pages.

Third Generation Partnership Project, "Technical Specification Group Radio Access Network; NR; Physical layer procedures for control (Release 16)," 3GPP TS 38.213 V16.1.0, Mar. 2020, 156 pages.

Interdigital, Inc., "Discussion on SRS Enhancements", 3GPP Tdoc R1-2005487, 3GPP TSG RAN WG1 #102-e, e-Meeting, Aug. 17-28, 2020, 5 pages.

\* cited by examiner

METHODS AND APPARATUS FOR FLEXIBLE APERIODIC SRS TRANSMISSION

CROSS-REFERENCE TO RELATED APPLICATIONS

This application is a continuation application of U.S. patent application Ser. No. 18/013,797, filed on Dec. 29, 2022, which is a U.S. National Stage Application under 35 U.S.C. 371 of International Patent Application No. PCT/US2021/041075, filed Jul. 9, 2021, which claims priority to and the benefit of U.S. Provisional Application No. 63/049,932 filed in the U.S. Patent and Trademark Office on Jul. 9, 2020, U.S. Provisional Application No. 63/091,597 filed in the U.S. Patent and Trademark Office on Oct. 14, 2020, and U.S. Provisional Application No. 63/169,974 filed in the U.S. Patent and Trademark Office on Apr. 2, 2021, the entire contents of each of which being incorporated herein by reference as if fully set forth below in their entirety and for all applicable purposes.

SUMMARY

Embodiments disclosed herein generally relate to communication networks, wireless and/or wired. For example, one or more embodiments disclosed herein are related to methods and apparatus for flexible aperiodic sounding reference signal (SRS) transmission.

In one embodiment, a method implemented in a wireless transmit/receive unit (WTRU) for wireless communications includes receiving configuration information of one or more sounding reference signal (SRS) resource sets, and each SRS resource set of the one or more SRS resource sets is associated with a slot offset and a set of slot offset deltas, receiving downlink control information (DCI) indicating an SRS request, and the SRS request indicates an SRS resource set of the one or more SRS resource sets, determining an SRS configuration from a set of SRS configurations for SRS transmissions, determining a slot for transmitting an SRS based on the determined SRS configuration, and transmitting, in the determined slot, the SRS using resources of the indicated SRS resource set.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Communications Networks and Devices

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
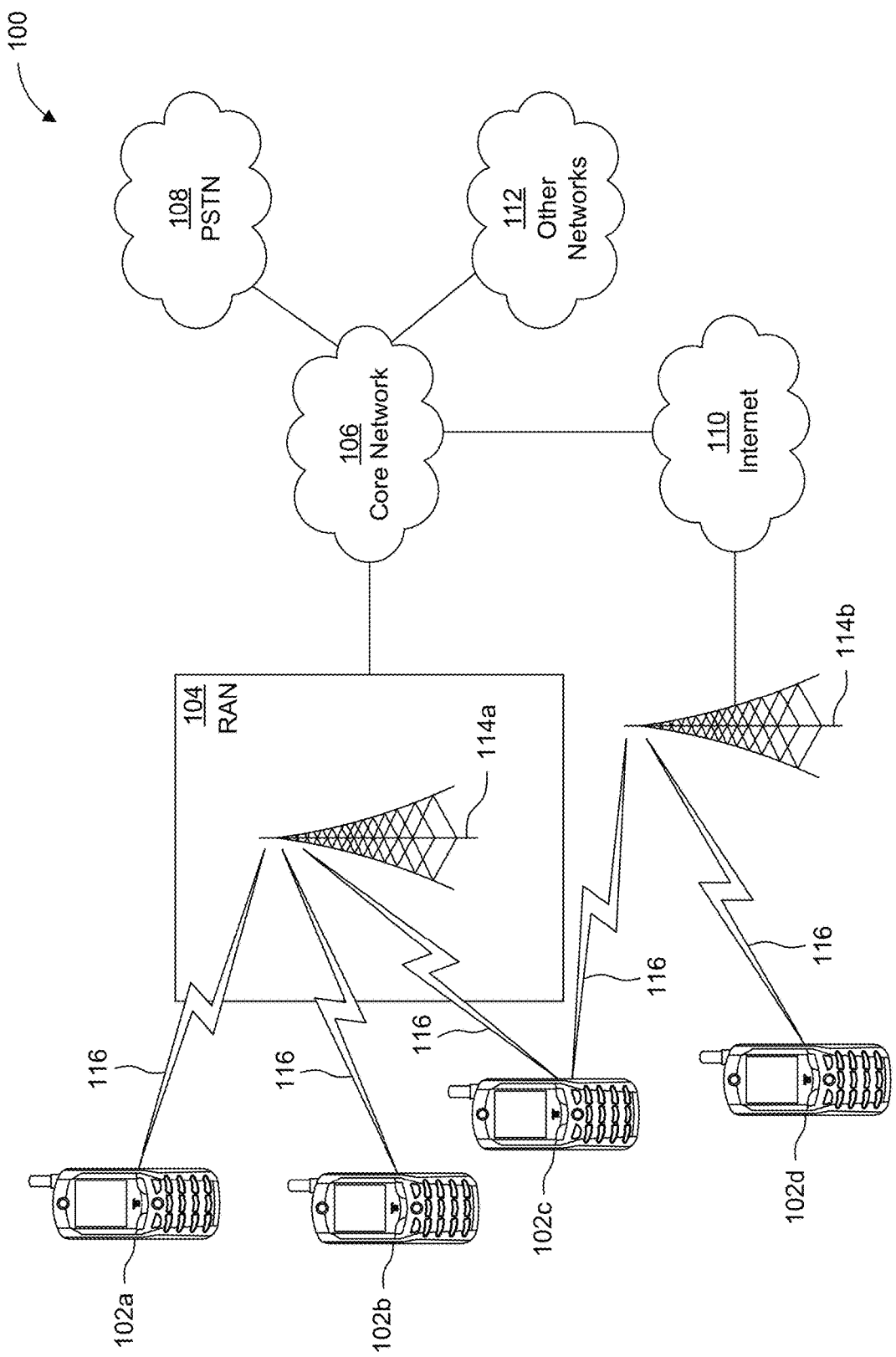
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
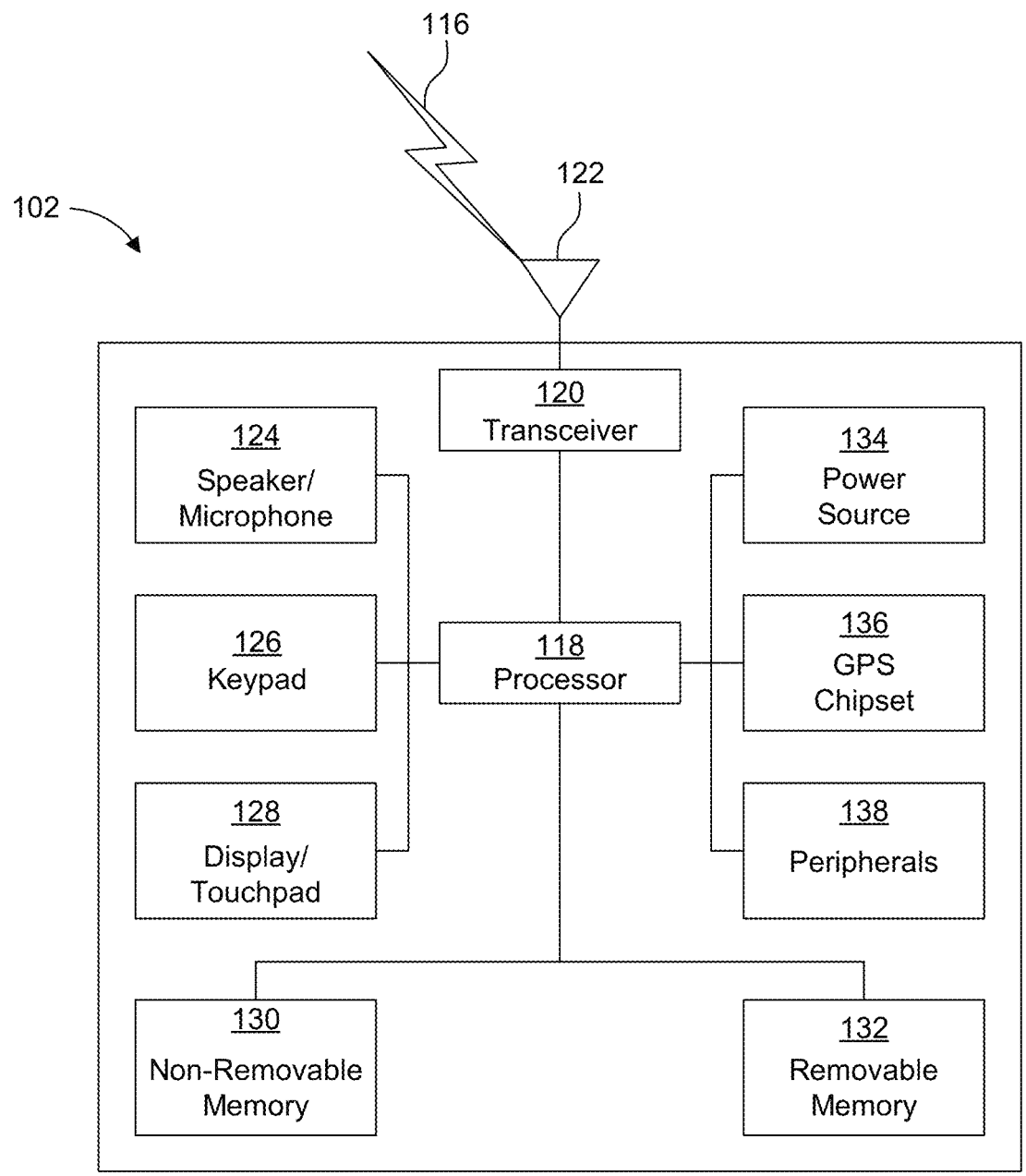
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD)

memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a halfduplex radio for which transmission and reception of some or all of the signals (e.g., associated with particular subframes for either the UL (e.g., for transmission) or the downlink (e.g., for reception).

Figure 1C:
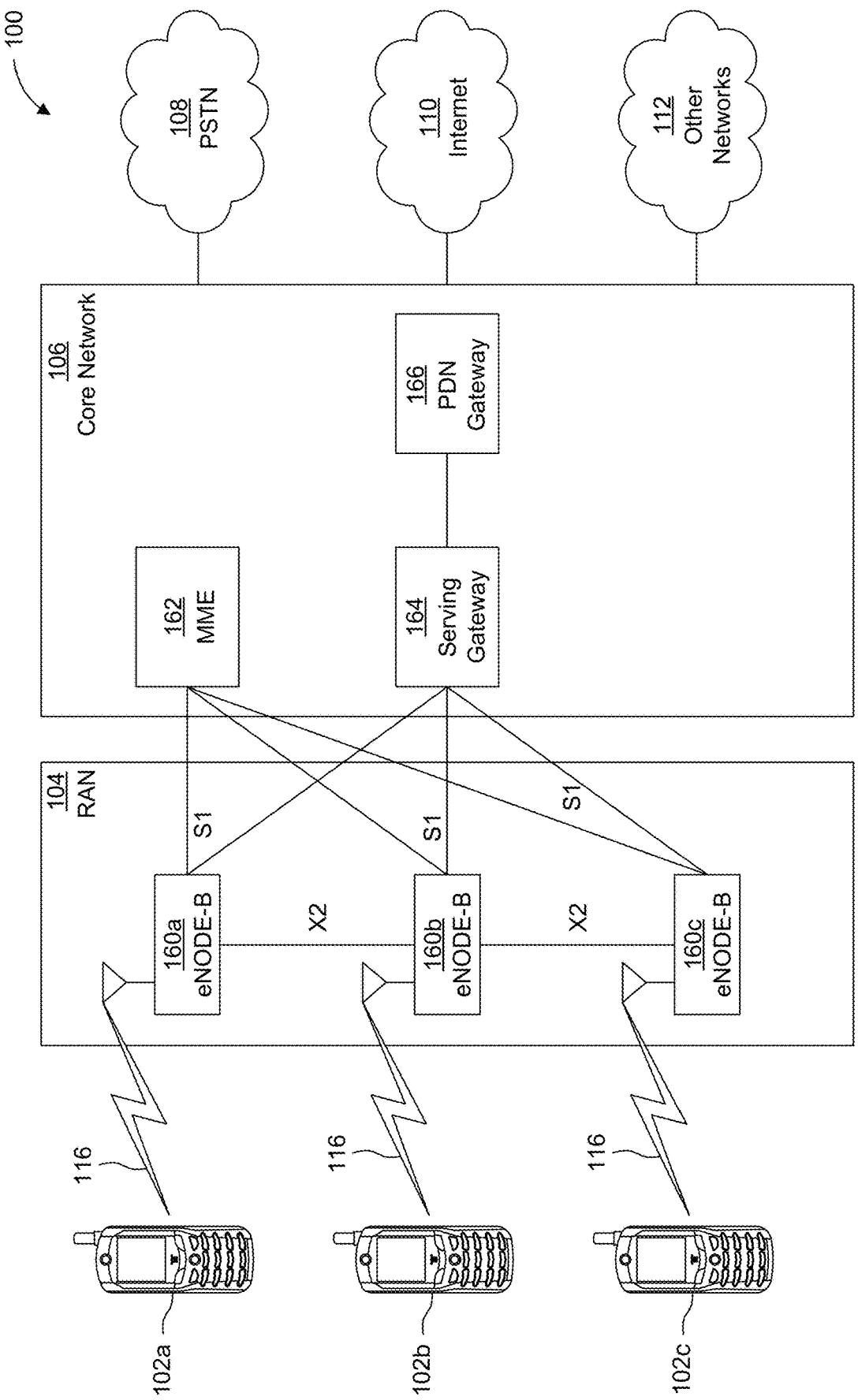
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHZ channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
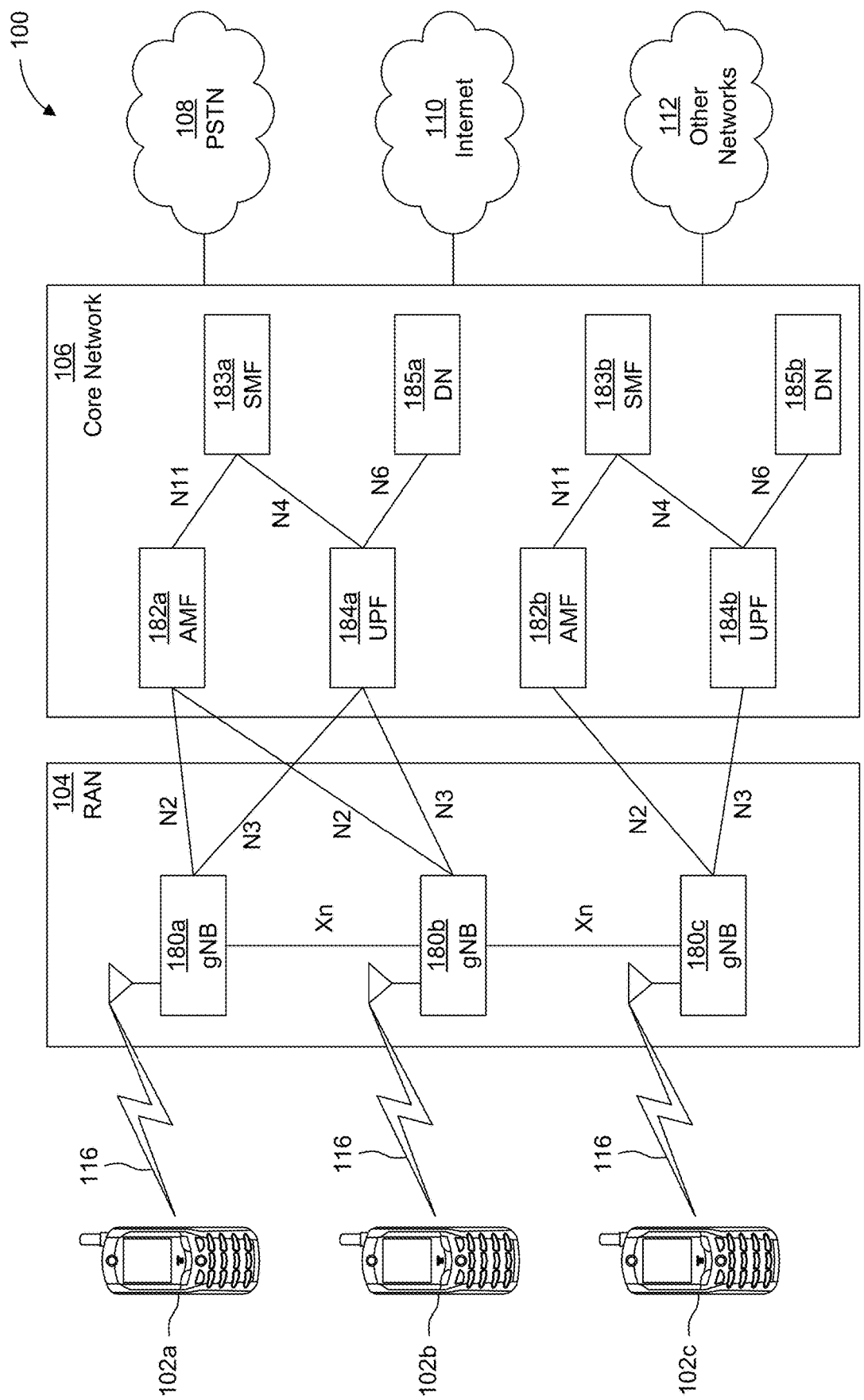
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Sounding Reference Signal (SRS) Transmission

Sounding reference signal (SRS) is primarily used for uplink channel measurement. SRS transmission may also be used to assist downlink channel state information (CSI) estimation for partial or fully reciprocal channels. Moreover, SRS may be used for beam management where SRS transmission through different SRS resources supports beam selection(s) by a network (e.g., a gNB). Therefore, enabling a dynamic and flexible sounding procedure with adequate capacity and coverage is essential to an MIMO system (e.g., enhance MIMO performance).

In 5G new radio (NR) (e.g., NR Release 16), a WTRU (e.g., UE) may be configured with one or more SRS resource sets (e.g., SRS-ResourceSet) containing up to K SRS resources where K is based on WTRU (e.g., UE) capability. An SRS resource set may be set for different applications (e.g., usage) as: beamManagement, codebook, nonCodebook or antennaSwitching. In some examples, time domain behavior of SRS resource configuration is indicated by a higher layer parameter resource Type. The time domain behavior may be configured as periodic, semi-persistent, and/or aperiodic. In NR (e.g., NR Release 16), a WTRU cannot have different time domain behavior (e.g., periodic and semi-persistent), and in some cases, the WTRU cannot have different periodicities for SRS resources within a same SRS resource set.

In some examples, if a WTRU is triggered to transmit SRS(s) on same symbol(s), an aperiodic SRS has a higher transmission priority over a periodic SRS and/or semi-persistent SRS. In some cases, an aperiodic SRS has priority over Physical Uplink Control Channel (PUCCH), if the aperiodic SRS is triggered to be transmitted on a same symbol that also used for PUCCH, except when PUCCH is carrying a Hybrid Automatic Repeat Request (HARQ) (e.g., a HARQ-ACK or NACK), a link recovery request, and/or a scheduling request (SR).

In a semi-persistent SRS operation, a WTRU may be activated/deactivated by a downlink control information (DCI) to start/stop SRS transmission(s). However, the impact from misdetection of deactivation signal may be significant as a WTRU may continue sending SRS(s) which may result in unnecessary interference and WTRU battery consumption.

Figure 2:
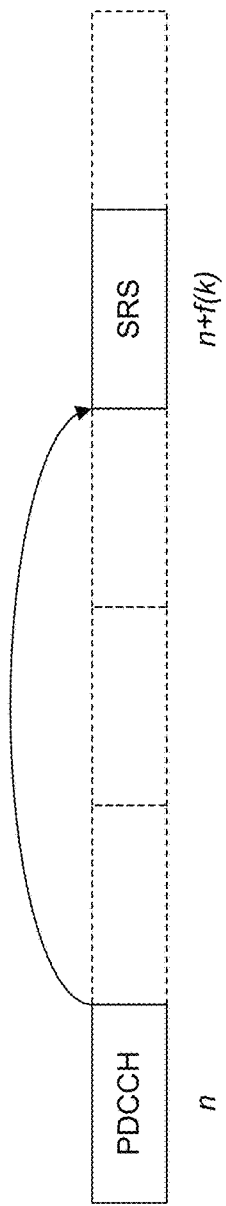
FIG. 2 is a slot diagram illustrating an operation of an aperiodic SRS transmission, according to one or more embodiments.

FIG. 2 illustrates an exemplary operation of an aperiodic SRS transmission. For aperiodic SRS configuration, a WTRU (e.g., a UE) may receive a set of higher layer parameters for SRS-ResourceSet, including, for example: slotOffset, srs-ResourceSetId, AperiodicSRS-Resource Trigger, and/or AperiodicSRS-Resource TriggerList. An aperiodic SRS transmission could be triggered, by a WTRU specific DCI, a group common DCI, or an uplink DCI. An associated SRS request field (e.g., a two-bit SRS request field) in DCI format 0_1, format 1_1, format 0_2 (if SRS request field is present), and format 1_2 (if SRS request field is present) may trigger the corresponding SRS transmission.

Based on 3GPP standards (e.g., 3GPP TS 38.214, Release 16), if a WTRU receives a DCI triggering aperiodic SRS in slot n, the WTRU transmits aperiodic SRS in each of the triggered SRS resource set(s) in slot:

$$f(k) = \left[ n \cdot \frac{2^{\mu_{SRS}}}{2^{\mu_{PDCCH}}} \right] + k + \left[ \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right]$$

where k is configured via a higher layer parameter slotOffset for each triggered SRS resources set, and the configuration of k is based on the respective subcarrier spacing of the triggered SRS transmission.

In some current implementations, when a WTRU receives DCI triggering an aperiodic SRS, the slot level offset to send the aperiodic SRS depends on slotOffset, which is a higher layer parameter configured by radio resource control (RRC) signaling. Relying on an RRC configured value for determination of a transmission slot for aperiodic SRS imposes certain limitation on the performance of a wireless communications system. For example, if the indicated slot offset happens to occur in a downlink (DL) slot, the intended SRS transmission will be ignored, and the scheduler is required to retry for another opportunity. In another example, in a multi-user MIMO (MU-MIMO) system, several users may be triggered to embark on a simultaneous aperiodic SRS transmission to provide an accurate estimation of the channel and the interference for the scheduler. However, triggering all WTRUs at the same time (that involves transmission of several simultaneous DCIs) may cause a congestion for downlink control channel or DL transmissions.

By allowing the aperiodic SRS's slot level offset to be configured by Layer 1 (L1), a potential collision of SRS transmission and other transmissions may be avoided. As such, an aperiodic SRS could be transmitted more flexibly and reliably with less overhead and latency. Therefore, to further increase the flexibility of aperiodic SRS, it is desired to dynamically control SRS transmissions, for example, enhanced control of SRS triggering offset(s).

Two-Step Offset Indication(s)

In various embodiments, a WTRU configured for aperiodic SRS transmission may determine a slot for aperiodic SRS transmission in two steps. In an example, a WTRU may be configured or indicated with more than one set of information for determination of the slot index for SRS transmission.

RRC Configured Delta Offset Value

In various embodiments, a WTRU may receive a first configuration (e.g., an SRS configuration) via RRC signaling that includes the slotOffset value (k), and receive a second configuration (e.g., slotOffset_delta) via RRC signaling. The second configuration may contain one or more delta offset values that may be used to correct the first set of RRC configured offset value (e.g., slotOffset (k) received in or determined from the first configuration). To trigger the aperiodic SRS transmission, a WTRU may receive a DCI or a medium access control (MAC) Control Element (CE) having a field (e.g., n bits) for indicating the slotOffset_delta where each state of the DCI or MAC CE field may be used as an index to a specific configured delta offset value (Δk) in the configured slotOffset_delta. A WTRU may determine the slot index for aperiodic SRS transmission by combining the indicated slotOffset and slotOffset_delta values, e.g., k+Δk.

Figure 3:
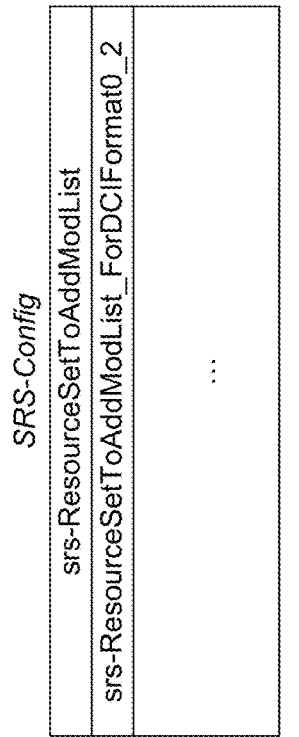
FIG. 3 is a diagram illustrating an example of an SRS configuration structure, according to one or more embodiments.
Figure 3:
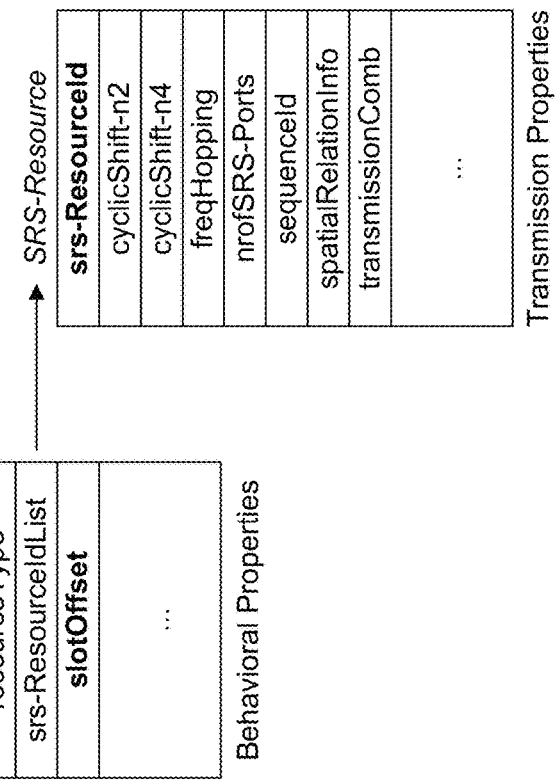

FIG. 3 illustrates an example of an SRS configuration structure in NR. As demonstrated in FIG. 3, SRS configuration (e.g., overall RRC SRS configuration) may be divided into three different levels of properties, namely: SRS-Config, SRS-ResourceSet, SRS-Resource, where high level properties, behavioral properties, and resources level properties are defined, respectively.

In one embodiment, a WTRU may be configured with slotOffset_delta as part of SRS-Config. Therefore, the configured slotOffset_delta may be applied to all SRS resource sets and/or SRS resources.

In one embodiment, a WTRU may be configured with slotOffset_delta as part of SRS-ResourceSet. Therefore, the configured slotOffset_delta may be applied only to the SRS resources configured in that SRS resource set.

In another embodiment, a WTRU may be configured with slotOffset_delta as part of SRS-Resource configuration. Therefore, the configured slotOffset_delta may be applied only to a specific configured SRS resource of an SRS resource set.

In one embodiment, the delta offset value may be configured in one or more level of SRS configuration. In an example, a WTRU may be configured with two delta offset values configured in SRS-ResourceSet and SRS-Resource. Therefore, the received DCI or MAC CE field may point to a specific combination of offset values configured in SRS-ResourceSet and SRS-Resource.

MAC CE Indicated Delta Offset Value

In one embodiment, a WTRU may receive a first configuration (e.g., an SRS configuration via RRC signaling) that includes the slotOffset value (k), and receive a second configuration by a MAC CE (e.g., slotOffset_delta) indicating one or more delta offset values. In some examples, the offset value indicated by a MAC CE may include or indicate one or more delta offset values.

Figure 4:
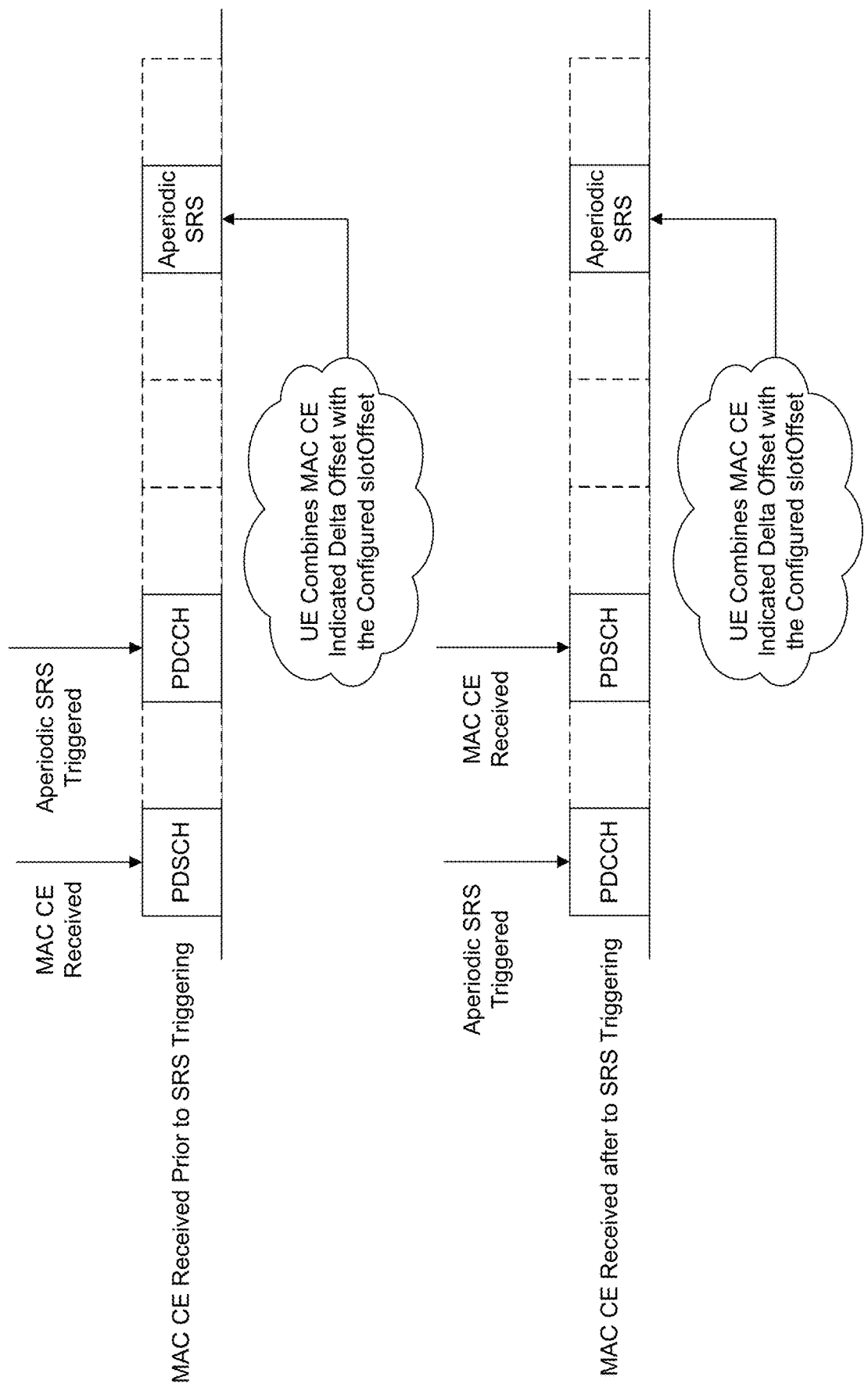
FIG. 4 is a slot diagram illustrating an example of delta offset indication(s) by a medium access control (MAC) Control Element (CE) or MAC CE, according to one or more embodiments.

As shown in FIG. 4, a WTRU may receive a MAC CE (containing slotOffset_delta) prior to or after (or on the same slot) the DCI triggering an aperiodic SRS transmission. In one embodiment, one or more delta offset values, indicated by slotOffset_delta in a MAC CE, may be valid until updated (e.g., by the network, a scheduler, or a gNB).

In one embodiment, a WTRU may be configured with a time validity window with reference to the reception of a physical downlink control channel (PDCCH) (or DCI) triggering an aperiodic SRS transmission, by which a WTRU may consider slotOffset_delta (indicated by an MAC CE), for example, only if the MAC CE is received within the time validity window. In an example, a time validity window may be defined by two integer values, where the first may define the start of the window, and the second may define the end of the window, with respect to "slot n" where the PDCCH triggering the aperiodic SRS is received.

In one embodiment, a WTRU may receive an explicit indication (e.g., a DCI flag) or an implicit indication (e.g., a mode of operation to consider), or may alternatively ignore slotOffset_delta indicated by a MAC CE.

In various embodiments, when a WTRU receives slotOffset_delta via a MAC CE that contains more than one delta offset value, the WTRU may receive a DCI with an m-bit field to trigger the aperiodic SRS transmission. Each state of the DCI field may be used as an index to a specific configured delta offset value ($\Delta k$) in the slotOffset_delta. The WTRU may determine the slot index for aperiodic SRS transmission by combining the indicated slotOffset and slotOffset_delta values, e.g., k+$\Delta k$.

In various embodiments, when a WTRU receives slotOffset_delta via a MAC CE that contains a single delta offset value, the WTRU may receive a DCI to trigger the aperiodic SRS transmission. The WTRU may determine the slot index for aperiodic SRS transmission by direct combining the indicated slotOffset and slotOffset_delta values, e.g., k+$\Delta k$.

In one embodiment, a WTRU may receive a group common DCI to trigger an aperiodic SRS transmission simultaneously for several users (e.g., multiple WTRUs), where each WTRU in the group may receive a respective MAC CE containing a different slotOffset_delta to indicate a corresponding delta offset value for adjusting the individual RRC configured slotOffset.

Implicitly Indicated Delta Offset Value

In one embodiment, a WTRU may receive a first configuration (e.g., an SRS configuration via RRC signaling) that includes the slotOffset value (k), and receive or determine a second configuration implicitly. The second configuration may include one or more parameters (e.g., slotOffset_delta) indicating the delta offset value(s) to correct the first configured offset value (e.g., a value, such as slotOffset, received from an SRS configuration via RRC signaling). In an example, a WTRU may receive a DCI that is scrambled with a radio network temporary identifier (RNTI) correspond directly to a specific slotOffset_delta value, or through an index to an RRC configured slotOffset_delta set as described herein (e.g., the earlier section "RRC Configured Delta Offset Value"). In another example, a WTRU may be configured with more than one search space and/or CORESET and each may directly correspond to a slotOffset_delta or through an index to an RRC configured slotOffset_delta set as described herein (e.g., the earlier section "RRC Configured Delta Offset Value").

Single DCI Indication

In various embodiments, SRS resource sets may be interchangeably referred to as SRS resources.

Enhanced SRS Configuration

For aperiodic SRS configuration, a WTRU may receive a set of higher layer parameters for SRS-ResourceSet, including any of: slotOffset, srs-ResourceSetId, AperiodicSRS-Resource Trigger, and AperiodicSRS-Resource TriggerList. An aperiodic SRS transmission may be triggered by a WTRU specific DCI, a group common DCI, or an uplink DCI.

In various embodiments, a WTRU with its usage set to codebook or noncodebook, may be configured with more than one SRS resource set (e.g., multiple SRS resource sets or SRS resources), and each SRS resource set may be configured with a different slotOffset value. In one embodiment, an SRS resource set indicator (e.g., indicated by a DCI or MAC CE) may indicate which SRS resource set to be used for aperiodic SRS transmission.

In various embodiments, a WTRU with its usage set to codebook or noncodebook, may be configured with more than two SRS resources, and each SRS resource may be configured with a different slotOffset_resource value. A respective configured slotOffset_resource may be used as a replacement of the configured slotOffset in SRS-ResourceSet, or as a correction to the configured slotOffset.

Re-Use of Existing DCI Formats

In various embodiments, a WTRU may determine one or more slot offsets for SRS resource sets based on one or more of following.

In one embodiment, a WTRU may determine one or more slot offsets for SRS resource sets based on one or more dedicated DCI formats:

a) For example, the WTRU may dynamically determine slot offsets for SRS resources based on one or more dedicated DCI formats (e.g., one or more of DCI format 0_3, DCI format 1_3, and DCI format 2_7). The dedicated one or more DCI formats may comprise one or more of following:
i) A Non-SUL/SUL indicator:
  (1) In one embodiment, if the WTRU is configured with a cell with multiple uplinks (ULs), the WTRU may determine one of more ULs of the multiple ULs based on an indicator. For example, if the WTRU receive a first indication based on the indicator, the WTRU may determine a first uplink (e.g., non-supplementary uplink). If the WTRU receive a second indication based on the indicator, the WTRU may determine a second uplink (e.g., supplementary uplink).
ii) An SRS Request:
  (1) In one embodiment, the WTRU may determine SRS transmission based on an indicator. For example, if the WTRU receive a first indication based on the indicator, the WTRU may transmit a first set of SRS resource sets. If the WTRU receive a second indication based on the indicator, the WTRU may transmit a second set of SRS resource sets.
  (2) In one embodiment, the WTRU may determine SRS transmission based on an indicator. For example, if the WTRU receive a first indication based on the indicator, the WTRU may not transmit no SRS resource sets. If the WTRU receive a second indication based on the indicator, the WTRU may transmit a first set of SRS resource sets. If the WTRU receive a third indication based on the indicator, the WTRU may transmit a second set of SRS resource sets.
iii) Transmit Power Control (TPC) command:
  (1) In one embodiment, the WTRU may determine transmit power of SRS resource sets based on an indicator. For example, if the WTRU receive a first indication based on the indicator, the WTRU may determine a first transmit power of SRS resource sets. If the WTRU receive a second indication based on the indicator, the WTRU may determine a second power of SRS resource sets.
iv) Slot offset for SRS resource sets (e.g., a slot offset for all triggered SRS resource sets):
  (1) In one embodiment, the WTRU may determine a slot offset for triggered SRS resource sets (e.g., via SRS request) based on an indicator. For example, if the WTRU receive a first indication based on the indicator, the WTRU may determine a first slot offset. If the WTRU receive a second indication based on the indicator, the WTRU may determine a second slot offset.
  (2) The determination of slot offset may be based on one or more of following:
    (a) Predefined slot offsets for indicated values;
    (b) Preconfigured slot offsets for indicated values; and
    (c) Explicit indication of slot offsets.
v) Slot offsets for SRS resource sets (e.g., a specific slot offset for an SRS resource set of triggered SRS resource sets):
  (1) In one embodiment, the WTRU may determine one or more slot offsets for triggered SRS resource sets (e.g., via an SRS request) based on a set of indicators. For example, if the WTRU receive a first set of indicators, the WTRU may determine a first set of slot offsets. If the WTRU receive a second set of indicators, the WTRU may determine a second set of slot offsets.
    (a) Number of slot offsets may equal to number of triggered SRS resource sets.
    (b) If the number of slot offsets is larger than the number of triggered SRS resource sets, the WTRU may apply slot offsets for all triggered SRS resource sets or triggered SRS resource sets which is not associated with slot offsets based on one or more of following:
      (i) Apply no slot offset;
      (ii) Apply a default slot offset;
      (iii) Apply an average value of indicated slot offsets; and
      (iv) Apply a first/last slot offset of indicated slot offsets.
    (c) If the number of slot offsets is smaller than the number of triggered SRS resource sets, the WTRU may indicate specific values (e.g., 0 or 1) for one or more indicators which are not associated with triggered SRS resource sets.
  (2) The determination of slot offsets may be based on one or more of following:
    (a) Predefined slot offsets for indicated values;
    (b) Preconfigured slot offsets for indicated values; and
    (c) Explicit indication of slot offsets.
  (3) The WTRU may apply determined set of slot offsets based on a determined slot offset (e.g., delta-offset). For example, if the WTRU receives a first slot offset for triggered SRS resource sets (e.g., a slot offset for all triggered SRS resource sets) and a second slot offset for a first SRS resource set of triggered SRS resource sets simultaneously, the WTRU may apply the first slot offset for all triggered SRS resource sets and the second slot offset for the first SRS resource set based on the first slot offset In one embodiment, a WTRU may determine one or more slot offsets for SRS resource sets based on one or more existing DCI formats:
b) For example, the WTRU may dynamically determine slot offsets for SRS resources based on one or more existing DCI formats (e.g., one or more of DCI format 0_1, DCI format 0_2, DCI format 1_1, DCI format 1_2, and DCI format 2_3).
c) The WTRU may determine the one or more existing DCI formats as a slot offset indication DCI based on one or more of following:
  i) RNTI.
    (1) In one embodiment, if a DCI is scrambled with a first RNTI (e.g., SRS-RNTI), the WTRU may determine the DCI as a DCI comprising one or more SRS slot offset indications. If the DCI is scrambled with a second RNTI (e.g., C-RNTI, CS-RNTI etc.), the WTRU may determine the DCI as a DCI with other purpose (e.g., PDSCH/PUSCH scheduling, configured grant activation/release, semi-persistent CSI activation/deactivation, TPC command etc.).
  ii) HARQ process number.
    (1) In one embodiment, if HARQ process number is set to first specific bits (e.g., all '0's), the WTRU may determine the DCI as a DCI comprising one or more SRS slot indications. If HARQ process number is not set to first specific bits, the WTRU may determine the DCI as a DCI for other purpose (e.g., PDSCH/PUSCH scheduling, configured grant activation/release, semi-persistent CSI activation/deactivation, TPC command, etc.).
iii) Redundancy version.
  (1) In one embodiment, if redundancy version is set to first specific bits (e.g., all '0's), the WTRU may determine the DCI as a DCI comprising one or more SRS slot indications. If redundancy version is not set to first specific bits, the WTRU may determine the DCI as a DCI for other purpose (e.g., PDSCH/PUSCH scheduling, configured grant activation/release, semi-persistent CSI activation/deactivation, TPC command etc.).
iv) Modulation and coding scheme.
  (1) In one embodiment, if modulation and coding scheme is set to first specific bits (e.g., all '0's), the WTRU may determine the DCI as a DCI comprising one or more SRS slot indications. If modulation and coding scheme is not set to first specific bits, the WTRU may determine the DCI as a DCI for other purpose (e.g., PDSCH/PUSCH scheduling, configured grant activation/release, semi-persistent CSI activation/deactivation, TPC command etc.).
v) Frequency domain resource assignment.
  (1) In one embodiment, if frequency domain resource assignment is set to first specific bits (e.g., all '0's), the WTRU may determine the DCI as a DCI comprising one or more SRS slot indications. If frequency domain resource assignment is not set to first specific bits, the WTRU may determine the DCI as a DCI for other purpose (e.g., PDSCH/PUSCH scheduling, configured grant activation/release, semi-persistent CSI activation/deactivation, TPC command etc.).
d) If the WTRU determine a DCI as a DCI comprising one or more slot offset indications, one or more of following fields may be used for the one or more slot offset indications:
  (1) Frequency domain resource assignment;
  (2) Time domain resource assignment;
  (3) Downlink assignment index (e.g., 1st and/or 2nd); and
  (4) Precoding information and number of layers.
e) The one or more slot offset indications may comprise one or more of following:
  i) Slot offset for SRS resource sets (e.g., a slot offset for all triggered SRS resource sets)
    (1) In one embodiment, the WTRU may determine a slot offset for triggered SRS resource sets (e.g., via SRS request) based on an indicator. For example, if the WTRU receive a first indication based on the indicator, the WTRU may determine a first slot offset. If the WTRU receive a second indication based on the indicator, the WTRU may determine a second slot offset.
    (2) The determination of slot offset may be based on one or more of following:
      (a) Predefined slot offsets for indicated values;
      (b) Preconfigured slot offsets for indicated values; and
      (c) Explicit indication of slot offsets.
  ii) Slot offsets for SRS resource sets (e.g., a specific slot offset for an SRS resource set of triggered SRS resource sets)
    (1) In one embodiment, the WTRU may determine one or more slot offsets for triggered SRS resource sets (e.g., via SRS request) based on a set of indicators. For example, if the WTRU receive a first set of indicators, the WTRU may determine a first set of slot offsets. If the WTRU receive a second set of indicators, the WTRU may determine a second set of slot offsets.
      (a) Number of slot offsets may equal to number of triggered SRS resource sets.
      (b) If the number of slot offsets is larger than the number of triggered SRS resource sets, the WTRU may apply slot offsets for all triggered SRS resource sets or triggered SRS resource sets which is not associated with slot offsets based on one or more of following:
        1. Apply no slot offset;
        2. Apply a default slot offset;
        3. Apply an average value of indicated slot offsets; and
        4. Apply a first/last slot offset of indicated slot offsets.
      (c) If the number of slot offsets is smaller than the number of triggered SRS resource sets, the WTRU may indicate specific values (e.g., 0 or 1) for indicators which is not associated with triggered SRS resource sets.
    (2) The determination of slot offsets may be based on one or more of following:
      (a) Predefined slot offsets for indicated values;
      (b) Preconfigured slot offsets for indicated values; and
      (c) Explicit indication of slot offsets.
    (3) The WTRU may apply determined set of slot offsets based on a determined slot offset (e.g., delta-offset). For example, if the WTRU receives a first slot offset for triggered SRS resource sets (e.g., a slot offset for all triggered SRS resource sets) and a second slot offset for a first SRS resource set of triggered SRS resource sets simultaneously, the WTRU may apply the first slot offset for all triggered SRS resource sets and the second slot offset for the first SRS resource set based on the first slot offset.

Advance Slot Indication

In various embodiments, a WTRU may receive an indication to transmit SRS in a time resource that belongs to a set of possible time occasions for SRS configured by higher layers. These solutions may enable the network to trigger transmission of SRS from many UEs in the same slot without excessive overhead in DCI or time scheduling restriction.

SRS Configured Time Pattern

Figure 5:
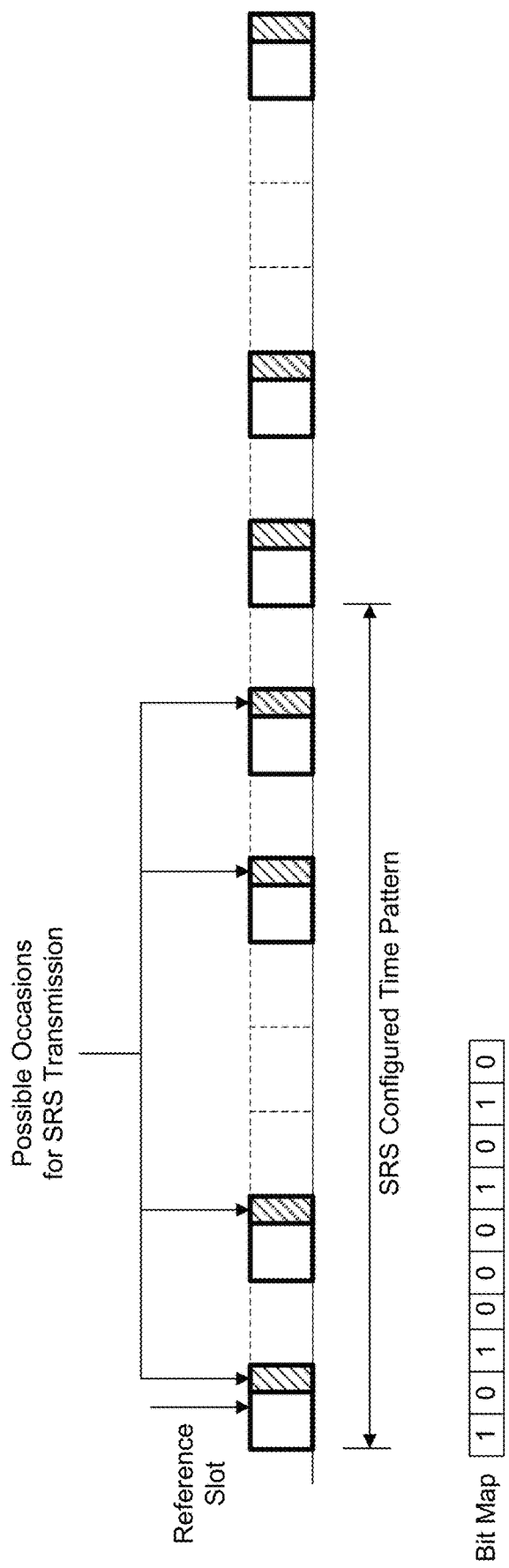
FIG. 5 is a diagram illustrating an example of an SRS configured time pattern, according to one or more embodiments.

The WTRU may be configured with at least one set of resources in time domain for possible transmission of SRS. Each such set may be referred to as "SRS configured time pattern" in the following. Each SRS configured time pattern may be associated with an index. For example, an SRS configured time pattern may consist of a set of time symbols or a set of time slots defined by a period and offset in terms of slots and/or symbols. In another example, an SRS configured time pattern may be characterized by a bitmap of a certain length and a time reference, such as the beginning of a symbol, slot, subframe and/or frame identified by a symbol number, slot number, subframe number of frame number respectively. The pattern may then be defined by the bitmap starting at the time reference and repeating thereafter. FIG. 5 shows an example of a configured time pattern.

The parameters defining an SRS configured time pattern may be configured by RRC or pre-defined. In one embodiment, a set of SRS configured time patterns may be configured separately from SRS resources. Alternatively, at least one SRS configured time pattern may be configured as part of SRS-resource configuration. For example, at least one SRS configured time pattern may be configured as a new "resource type."

Variable SRS Property Per Transmission Event

In various embodiments, a WTRU may be configured with an SRS configured time pattern, and each SRS transmission opportunity in the SRS configured time pattern may be associated with a respective (or different) SRS configuration, a respective (or different) SRS resource set configuration, and/or a respective (or different) SRS resource configuration.

In one embodiment, a WTRU may be configured with more than one type of SRS configuration. For example, a WTRU may be configured with two or multiple (different) types of SRS configuration(s), a first type may be used for a normal SRS operation, and a second type may be used when the WTRU is configured with an SRS time pattern.

In one embodiment, when each SRS transmission opportunity in the SRS configured time pattern is associated with a different SRS resource set configuration, the resource type may be assumed as aperiodic. In an example, a WTRU may assume or be configured with different usage (e.g., beamManagement, codebook, nonCodebook, and/or antennaSwitching) for each SRS transmission opportunity. For example, a WTRU may be configured to use a first transmission opportunity for beamManagement and a second transmission opportunity for antennaSwitching. In another example, for each configured SRS resource set (or a respective SRS resource set configuration), a WTRU may use a respective (or a different) SRS resource configuration according to the respective configured SRS resource set for the SRS transmission opportunity in the configured pattern (e.g., the SRS configured time pattern).

In one embodiment, when each SRS transmission opportunity in the SRS configured time pattern is configured with a same SRS resource set, but associated with a different SRS resource configuration, a WTRU may use a different SRS resource property for each respective SRS transmission opportunity.

In an example, a WTRU may be configured with more than one type of SRS resource set configuration. For example, a WTRU may be configured with two or multiple (different) types of SRS resource set configuration(s), a first type may be used for a normal SRS operation, and a second type may be used when the WTRU is configured with an SRS time pattern. In another example, a WTRU (configured with an SRS time pattern) may be configured with more than one SRS resource configuration for each respective SRS resource set.

In one embodiment, each SRS transmission opportunity may be configured to have a different SRS resource configuration to employ a different transmission property. In an example, a WTRU may use a different number of SRS ports in each respective transmission opportunity. In another example, to support multiple TRPs or increase transmission diversity, a WTRU may use a different spatialRelationInfo (e.g., spatial filter, beam) in each respective transmission opportunity. Additionally or alternatively, a WTRU may use a different cyclic shift or sequence in each respective transmission event to randomize potential interference(s).

SRS Configured Time Pattern Activation

In various embodiments, an SRS configured time pattern may be in an activated state or deactivated state. The WTRU may determine that the set of resources for possible transmission of SRS consists of the set of activated SRS configured time patterns only. These solutions may enable a network to modify SRS transmission opportunities more dynamically for each UE and thus modify MU-MIMO pairing candidates more efficiently.

The WTRU may determine the state by receiving RRC, MAC, or DCI signaling. For example, the WTRU may receive a MAC control element indicating which of the at least one SRS configured time pattern is activated, e.g. using a bitmap or at least one index to a SRS configured time pattern. In one embodiment, the WTRU may determine a unique activated SRS configured time pattern based on an index received from RRC, MAC or DCI signaling and determine that any other SRS configured time pattern is deactivated. Upon reconfiguration of a set of SRS configured time patterns by RRC, the WTRU may determine that the initial state of each pattern is either activated or deactivated, either explicitly from the RRC signaling or implicitly (e.g., all activated, all deactivated, or first one activated only). Upon change of bandwidth part, the WTRU may implicitly determine that the state of each pattern is either activated or deactivated.

Triggered SRS Configured Time Pattern

In various embodiments, a WTRU may receive an indication (e.g. a first indication) to transmit SRS at a time in the future not included in the first indication. Such indication may be applicable to a specific set of SRS configured time patterns, such as a set of activated SRS configured time patterns or a set explicitly included in the indication. In this case, the WTRU may determine that such set of SRS configured time patterns may be in a "triggered" state. The WTRU may subsequently transmit SRS for a number of occasions for an SRS configured time patterns under a condition that it is in triggered state. Such transmission may occur following reception of a second indication or another event (e.g. start of a COT), as described in the following. After transmission of SRS for a configured time pattern, the WTRU may determine that such pattern is in a "untriggered" state. The WTRU may also determine that a pattern is in an "untriggered" state upon change of bandwidth part, or upon expiry of a timer started when the pattern is set to a "triggered" state. Upon reconfiguration of a set of SRS configured time patterns by RRC, or activation of a set of SRS configured time patterns, the WTRU may determine that the initial state of each pattern is either triggered or untriggered.

Triggering of SRS Transmissions

The WTRU may transmit SRS on at least one occasion defined by the at least one SRS configured time pattern based on the following.

In one embodiment, the WTRU may transmit on all occasions defined by the union of SRS configured time patterns, or alternatively by the union of activated SRS configured time patterns.

In one embodiment, the WTRU may transmit on a subset of occasions for an SRS configured time pattern upon reception of a DCI, following start of a COT or following successful access to the channel.

The following may be indicated in the DCI, signaled by MAC (e.g., an MAC EC) or an RRC message, or may be pre-defined: 1) a set of SRS configured time patterns for which SRS is transmitted; 2) a number of occasions for which SRS is transmitted for each pattern or a set of patterns; and/or 3) the first occasion for which SRS is transmitted for each pattern or a set of patterns. For example, such occasion may be the Nth occasion following a number of symbols S following the last symbol of the PDCCH for which the DCI is decoded, where N and S may be predefined or indicated in the DCI.

In various embodiments, the set of SRS configured time patterns may be restricted to the subset of activated patterns and/or triggered patterns.

Indication to Transmit Within a Channel Occupancy Time (COT)

Figure 6:
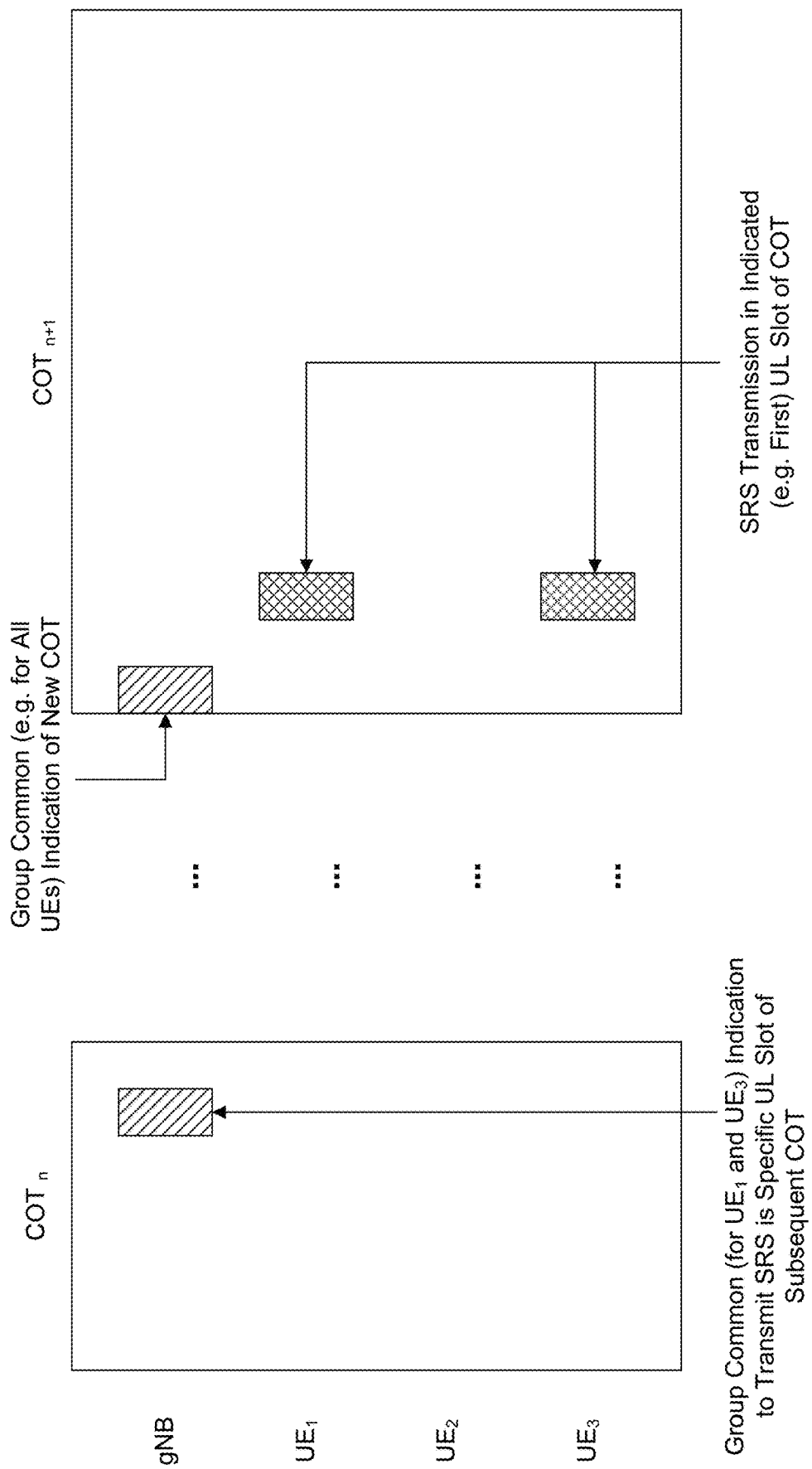
FIG. 6 is a diagram illustrating an example of using indication(s) for SRS transmission(s) in a first uplink slot of a subsequent Channel Occupancy Time (COT), according to one or more embodiments.

In various embodiments, a WTRU may receive an indication to transmit an SRS in a slot of a current or upcoming COT. For example, as demonstrated in FIG. 6, the WTRU may receive an indication via DCI or MAC CE to transmit an SRS in the next UL resources of a current COT. In another example, the WTRU may receive an indication to transmit an SRS in a specific (e.g. the first UL resource) UL resource of a subsequent or future COT. In this example, the WTRU may not need to receive a further indication to transmit the SRS and may do so upon determining or being indicated that the subsequent or future COT has begun.

Figure 7:
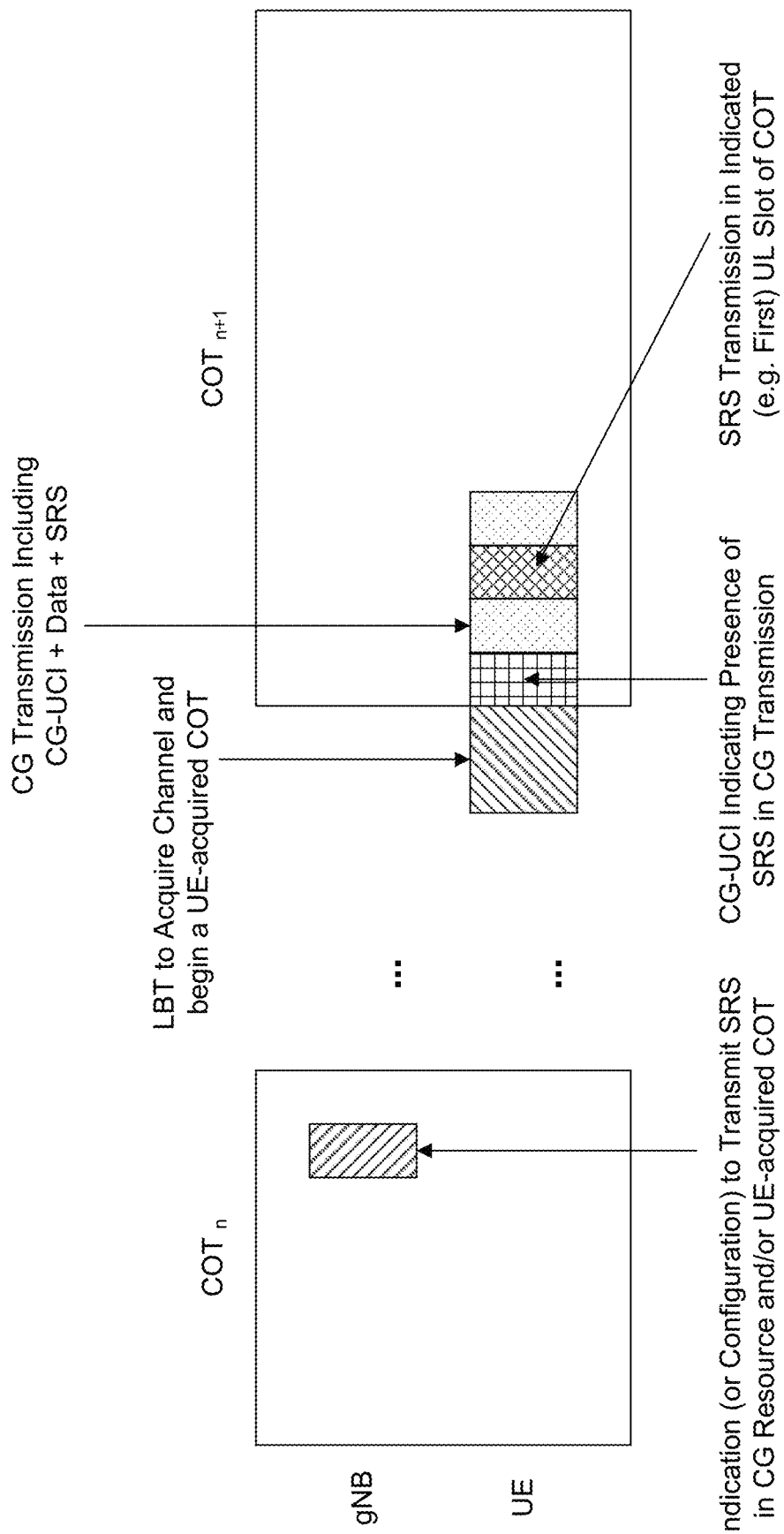
FIG. 7 is a diagram illustrating an example of an SRS transmission in a WTRU-acquired COT, according to one or more embodiments.

The WTRU may receive an indication that it may transmit an SRS in a specific (e.g. first) UL resource of a UE acquired COT. In such a case, a WTRU may transmit an SRS in an UL resource upon successfully acquiring the channel and beginning a UE-acquired COT. In some cases, as shown in FIG. 7, the gNB may be aware of the specific timing of when the WTRU will attempt to acquire the channel and begin a COT (e.g. if the gNB has granted specific resources on which the WTRU may attempt to acquire the channel). In other cases, the WTRU may autonomously determine when to acquire the channel as a function of whether it has any data to transmit (e.g. on configured grant resources). The WTRU may thus indicate to the gNB when a transmission includes a previously triggered SRS. For example, the WTRU may receive a command to transmit SRS in a specific UL resource of a next UE-acquired COT. The WTRU may only attempt to acquire a COT when it has data to transmit on a configured grant. The WTRU may indicate to the gNB whether the WTRU-acquired COT includes an SRS transmission. The WTRU may indicate to the gNB the presence of the SRS in at least one of: a standalone transmission, the configured grant UCI (CG-UCI), a PUCCH transmission, implicitly via a parameter of the SRS.

In one embodiment, upon receiving an indication from the network (e.g., a gNB) to transmit an SRS, the WTRU may attempt to acquire the channel at the next appropriately timed CG resource, regardless of the WTRU having data to transmit. The WTRU may thus transmit only the SRS in the CG resource, if the WTRU successfully acquires the channel.

In one embodiment, a WTRU may be configured with SRS transmission opportunities as defined earlier (e.g., an SRS configured time pattern). Such opportunities may be periodically occurring and may be defined with specific timing instances (and possibly with specific frequency locations). Upon receiving an indication to transmit an SRS in a future UL resource, the WTRU may transmit SRS in the next upcoming SRS transmission opportunity. The WTRU may determine the appropriate SRS transmission opportunity in which to transmit SRS as one that satisfies the offset indicated by the gNB. For example, the WTRU may determine to transmit SRS in the first SRS transmission opportunity that occurs after the time it received the indication plus the indicated offset timing. In another example, the WTRU may determine to transmit SRS in an SRS transmission opportunity that occurs within the period started by the time it received the indication and ending by the time indicated by the offset.

Inter-WTRU Coordination to Transmit SRS

In various embodiments, a WTRU may acquire a COT, and determine the WTRU has resources to transmit SRS and the WTRU is required to transmit SRS. The WTRU may transmit a WTRU-to-WTRU (or UE-to-UE) indication that an upcoming SRS transmission resource will be used for transmission of SRS, e.g. prior to transmitting the SRS. Other UEs may listen for such a transmission from a neighboring UE. Upon reception of a UE-to-UE indication, other UEs may transmit SRS in the same resources. This may enable multi-UE transmission of SRS, possibly to support MU-MIMO.

LBT for Transmission of Triggered SRS

In various embodiments, a WTRU may only use a channel to transmit SRS. In such cases, the WTRU may not need to perform channel access (e.g., Listen Before Talk (LBT)) prior to transmitting SRS. In other cases, if the WTRU has data to transmit on resources that are adjacent to the SRS resources, the WTRU may perform channel access (e.g., LBT). The selection of the LBT type to perform may depend on at least one of: the presence of data, type of data, timing of the UL transmission with respect to the previous DL transmission (e.g. gap), or an indication received by the WTRU.

SRS Transmission Indication

In various embodiments, a WTRU may receive an indication to transmit an SRS in a current or subsequent COT. Such an indication may be received by DCI or MAC CE. The indication may reuse other control channel transmissions. For example, the WTRU may receive the indication to transmit SRS in a DCI used to indicate a COT is active. For example, a GC-PDCCH indicating an active COT may also be used to indicate to the WTRU to transmit an SRS (possibly with a timing offset). The timing offset may be determined as a function of the COT timing.

Multiple Timing Offsets

In various embodiments, an indication of SRS transmission may include or may map to multiple timing offsets. The WTRU may determine which timing offset as a function of at least one of:

Whether a channel is acquired for the intended SRS transmission time (e.g. whether there is an active COT). In this example, the WTRU may transmit SRS using the first timing offset for which the channel is available to transmit on.

A parameter of the active COT. For example, if the WTRU acquired a first set of unlicensed sub-bands for a COT, the WTRU may use a first timing offset for the transmission of the SRS. If the WTRU acquires a second set of unlicensed sub-bands for a COT, the WTRU may use a second timing offset for the transmission of the SRS.

The type of data the WTRU needs to transmit (e.g. as a function of the contents of its buffer). For example, higher priority data may be associated with a first timing offset and lower priority data may be associated with a second timing offset.

Whether the WTRU has any data to transmit; and

The priority of the SRS transmission. For example, different SRS transmissions may be assigned different priorities.

Two-Step DCI Indication

In various embodiments, a WTRU may transmit SRS based on receipt of an SRS configuration trigger and (e.g., combined with) an SRS transmission trigger. In some examples, a mechanism of two-step DCI indication may include using an SRS configuration trigger and an SRS transmission trigger in different downlink control channels (e.g., multiple DCIs or PDCCHs) for dynamic aperiodic SRS control and SRS transmissions. In some cases, the mechanism of two-step DCI indication may reduce overload of PDCCH traffic.

Figure 8:
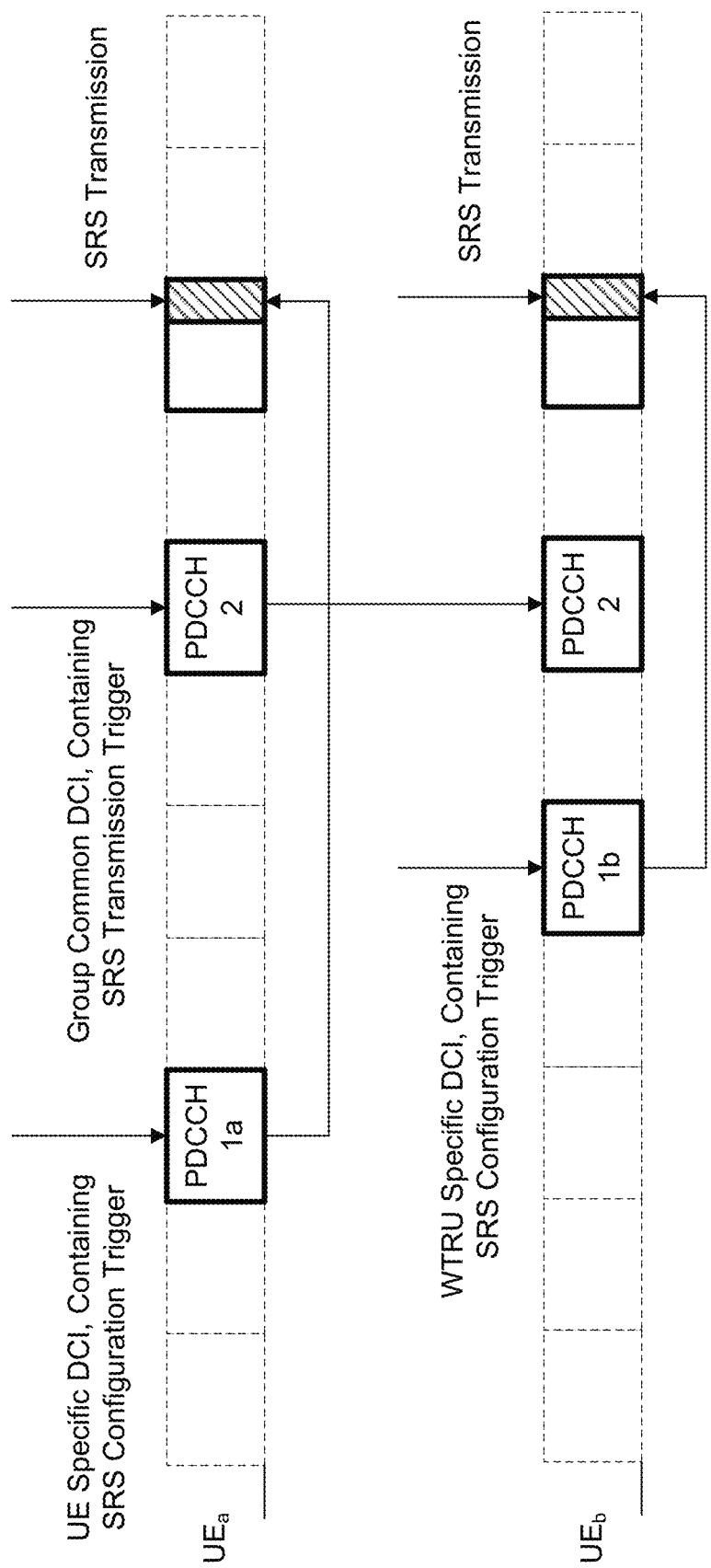
FIG. 8 is a slot diagram illustrating an example of a mechanism of two-step DCI indication(s) for SRS transmission(s), according to one or more embodiments.

FIG. 8 shows an example of two-step DCI indication mechanism. In an example, a WTRU may receive an SRS configuration trigger in a first DCI (e.g., a WTRU-specific DCI). The WTRU may receive an SRS transmission trigger in a second DCI (e.g., a group common DCI). Each DCI may be received in a corresponding PDCCH. A PDCCH may be received in a UE-specific search space or a common search space (SS). In an example, the SRS configuration trigger may be received in a WTRU-specific SS and the SRS transmission trigger may be received in a common SS. The WTRU may be configured with an RNTI (e.g., a UE-specific RNTI or a group RNTI) that may be used for (e.g., used specifically for) the SRS transmission trigger. The WTRU may be configured with an RNTI (e.g., a UE-specific RNTI or a group RNTI) that may be used for (e.g., used specifically for) the SRS configuration trigger. The cyclic redundancy check (CRC) of a DCI may be scrambled with an RNTI discussed herein. The WTRU may use the RNTI to receive the DCI (e.g., using the RNTI to decode the DCI successfully).

In another example, a WTRU may receive one trigger in a MAC-CE and the other trigger in a DCI. For example, the WTRU may receive an SRS configuration trigger in a MAC-CE. The WTRU may receive an SRS transmission trigger in a DCI. In another example, the WTRU may receive each of the triggers in a corresponding MAC-CE (e.g., different MAC-CEs).

A WTRU may be configured with one or more sets of resources that may be used for SRS transmission. A set of resources may include one or more resources in frequency and/or time (e.g., a pattern of resources in frequency and/or time). A frequency resource may be or may include one or more resource elements (REs), resource blocks (RBs), or physical RBs (PRBs). The configuration of a set of resources may identify the frequency resources (e.g., frequency locations) for SRS transmission and/or time locations for SRS transmission. A time location may, for example, include a starting symbol, a number of symbols, which symbols in a time duration such as a slot, a number of slots, a pattern of symbols and/or slots, and the like.

In various embodiments, a resource set (e.g., SRS resource set) and a set of resources (e.g., SRS resources) may be used interchangeably herein.

In various embodiments, an SRS configuration trigger may identify one or more of the configured sets of SRS resources that may be used for SRS transmission. By identifying a set of SRS resources, the trigger may (e.g., via the configuration of the resource set) identify resources in time and/or frequency for SRS transmission. The identified resources may be in one or more slots.

In an example, a resource set may have a slot offset associated with it (e.g., a resource set may be configured with a slot offset). An SRS configuration trigger may indicate whether to use the associated (e.g., configured) slot offset or ignore the slot offset and, for example, wait for an SRS transmission trigger to transmit. If the SRS configuration trigger indicates to use the slot offset, the WTRU may transmit SRS in the indicated resources in the slot indicated by the slot offset. The slot offset may indicate an offset in slots from the slot in which the PDCCH (or MAC-CE) carrying the SRS configuration trigger is received. If the SRS configuration trigger indicates to not use the slot offset, the WTRU may not transmit SRS in response to receipt of the SRS configuration trigger. The WTRU may transmit SRS in response to receiving an SRS transmission trigger that may be received after the SRS configuration trigger.

In another example, a WTRU may not transmit SRS in response to receipt of an SRS configuration trigger. The WTRU may understand that the trigger is for configuration and not for transmission, for example, independent of whether the SRS resource set is configured or associated with a slot offset.

In an example, an SRS resource set (e.g., an SRS resource set for use with a configuration trigger and a transmission trigger) may not be configured with a slot offset or may not have a slot offset associated with it. The WTRU may not transmit SRS in response to receipt of the SRS configuration trigger. The WTRU may transmit SRS in response to receiving an SRS transmission trigger that may be received after the SRS configuration trigger.

An SRS transmission trigger may indicate one or more of the following: slot offset, number of slots, pattern of slots, first slot, etc. An SRS transmission trigger may indicate one or more SRS time-related parameters. A time-related parameter may be a slot, a slot offset, a starting slot, a number of slots, a pattern of slots, a starting symbol, a number of symbols, a pattern of symbols, etc.

In an example, a WTRU may use an SRS configuration trigger to determine one or more (e.g., all) of the frequency related parameters of an SRS transmission. The WTRU may use the SRS configuration trigger to determine at least some of the time-related parameters for the SRS transmission. The WTRU may use the SRS transmission trigger to determine at least some (e.g., some other) of the time-related SRS parameters.

The value of a time-related parameter indicated by a transmission trigger may override the value of the time-related parameter indicated by a configuration trigger. For example, a WTRU may receive an indication of a first value for a time-related parameter via a configuration trigger. The WTRU may receive an indication of a second value for the time-related parameter via a transmission trigger. The WTRU may use the second value for the time-related parameter, for example when determining when to transmit SRS.

A WTRU may receive an SRS configuration trigger in or with an UL grant DCI or a DL grant DCI. A WTRU may receive an SRS transmission trigger in or with an UL grant DCI or a DL grant DCI.

A WTRU may receive an SRS transmission trigger in a DCI that does not include or is not used for an UL grant or a DL grant. A WTRU may receive an SRS transmission trigger in a DCI that may be used for providing one or more of the following: a slot format indicator (SFI), a channel occupancy time (COT) indication, and/or a SS switching indication. A COT indication may indicate the remaining time in a COT, e.g., a COT acquired by a gNB. When the WTRU receives an SRS transmission trigger in a DCI that may be used to indicate SFI, COT indication and/or SS switching, one or more of the indications for SFI, COT indication and/or SS switching may or may not be present in the DCI.

A WTRU may transmit SRS based on, or in response to, receiving an SRS transmission trigger. The WTRU may transmit SRS relative to the receipt of the SRS transmission trigger. When a UE transmits SRS based on or in response to receiving an SRS transmission trigger, the WTRU may transmit SRS in resources in a slot indicated by a slot offset. The offset may be an offset in slots from the slot in which the PDCCH (or MAC-CE) carrying the SRS transmission trigger is received. In an example, the slot offset that the WTRU uses may be indicated by the SRS transmission trigger. The slot offset may be indicated directly by the transmission trigger. For example, the slot offset may be included in the DCI or MAC-CE that provides the transmission trigger. The slot offset may be indicated by an index or other indicator provided by the transmission trigger (e.g., by the DCI or MAC-CE). The index or other indicator may indicate a configured value from among a set of configured values for slot offset.

In an example, the slot offset the WTRU uses may be a configured slot offset. For example, the slot offset may be included in the configuration of the SRS resource set. The configuration trigger may indicate the resource set. The transmission trigger may indicate to use the slot offset configured for the resource set (e.g., use it relative to the transmission trigger).

In another example, an SRS resource set may have a set of slot offsets configured for it. The transmission trigger may indicate which of the slot offsets to use. In case only one slot offset is configured for a resource set, no indication of which to use may be needed, used and/or provided (e.g., when that resource set is indicated).

The WTRU may transmit SRS based on or using resources in time, time-related parameters, and/or frequency resources indicated by the combination of the configuration trigger and the transmission trigger. For example, the WTRU may transmit in the indicated frequency resources. The WTRU may transmit in the symbols and slots based on the indicated time-related parameters. The WTRU may transmit in one or more symbols, one or more slots and/or according to a set or pattern of symbols and/or slots, for example, based on the indicated time-related parameters.

One or more WTRUs may receive individual SRS configuration triggers. An SRS transmission trigger that may indicate a slot offset may be received by the one or more WTRUs. The one or more WTRUs may use the received slot offset and transmit SRS in the same slot. The one or more WTRUs may transmit SRS according to the resources and transmission parameters indicated by their respective configuration triggers.

SRS transmission parameters (e.g., including or other than time and/or frequency resources) may be provided by the configuration trigger and/or the transmission trigger. The WTRU may transmit SRS in accordance with the received transmission parameters. Transmission parameters indicated by the transmission trigger may override transmission parameters indicated by the configuration trigger.

An SRS resource set may include (e.g., may be configured with) a trigger mode indication. The trigger mode indication may indicate when, or based on which trigger, to use one or more parameters, e.g., time-related parameters for transmitting SRS. The trigger mode may be indicated by the SRS resource set that may be indicated by the SRS configuration trigger and/or the SRS transmission trigger received by the WTRU.

For example, the trigger mode indication may indicate whether to use the configured slot offset and/or one or more other parameters (e.g., time-related parameters) when a configuration trigger or a request indicating the resource set is received. A WTRU may use the trigger mode indication configured for the resource set to determine when (e.g., for or in response to which SRS trigger or request) to transmit SRS, e.g., according to the SRS resource set.

For example, for a first trigger mode, the WTRU may transmit SRS in response to an SRS configuration trigger or an SRS request or trigger received in an UL or DL grant. For a second trigger mode, the WTRU may not transmit SRS in response to an SRS configuration trigger or an SRS request or trigger received in an UL or DL grant. For a second trigger mode, the WTRU may transmit SRS in response to an SRS transmission trigger which may be after an SRS configuration trigger. For a second trigger mode, the WTRU may transmit SRS in response to and SRS transmission trigger or an SRS request or trigger not received with an UL or DL grant.

An SRS transmission may be considered a pending SRS transmission after receipt of an SRS configuration trigger. An SRS configuration trigger or a pending SRS transmission may be cancelled or may expire after an expiry time.

For example, if a WTRU may receive an SRS configuration trigger in a first slot and does not receive a transmission trigger for more than a threshold number of slots, the WTRU may cancel the SRS transmission associated with the SRS configuration trigger. If the WTRU receives an SRS transmission trigger and does not have a pending SRS transmission (e.g., based on an unexpired SRS configuration trigger), the WTRU may ignore the SRS transmission trigger. A number of slots is an example. Another unit of time may be used for the expiry time and/or threshold, for example, symbols, or milliseconds, etc.

In various embodiments, a threshold may be configured. The configuration of a threshold may be included in the configuration of an SRS resource set.

An SRS transmission trigger may be used when an SRS configuration trigger is received within a configured number of slots or a configured amount of time prior to the receipt of the SRS transmission trigger. If a WTRU may receive an SRS transmission trigger (e.g., in a slot) and the WTRU has not received an SRS configuration trigger within a number of slots or within an amount or window of time prior to the SRS transmission trigger, the WTRU may ignore the SRS transmission trigger. For example, the WTRU may not transmit SRS based on or in response to the transmission trigger. The number of slots or the amount of time may be a configured threshold number of slots or configured threshold amount of time. The number of slots or the amount of time may be a configured window of slots or a configured window of time.

In various embodiments, a threshold (e.g., a threshold of slots or time), or window of slots, or time (e.g., in milliseconds) may be configured via at least one of the following: an SRS configuration trigger, an SRS transmission trigger, an SRS resources set, and/or a separate configuration. Time and amount of time may be used interchangeably.

Mode Selection for SU/MU-MIMO

Mode of Operation

In various embodiments, one or more modes of operation may be used, defined, or configured for aperiodic SRS trigger based on the aperiodic SRS triggering offset determination, wherein an aperiodic SRS triggering offset may be an offset between a first slot in which a WTRU may receive an SRS trigger indication and a second slot in which the WTRU may send or transmit the triggered SRS resource and/or resource set. Hereafter, aperiodic SRS triggering offset may be interchangeably referred to as SRS offset, slot offset (or slotOffset), and/or triggering offset.

In a mode of operation, SRS offset may be determined, used, or selected in a semi-static manner. For example, an SRS offset may be configured for each SRS resource set or SRS resource and the associated SRS offset may be used, or determined when an SRS resource set or an SRS resource is triggered. In various embodiments, a set of SRS offset values may be predefined or configured, and one SRS offset value in the set may be selected, used, or configured for an SRS resource set or an SRS resource. In an example, one or more SRS resources may be associated with an SRS resource set. An SRS offset may be configured or determined for an SRS resource set and one or more SRS resources associated with the SRS resource set may use the SRS offset value configured to the associated SRS resource set.

In a mode of operation, SRS offset may be determined, used, selected, or indicated in a dynamic manner. For example, the SRS offset for a triggered SRS resource (or SRS resource set) may be dynamically determined based on an indication. One or more of following may apply: (1) SRS offset indication may be signaled in an associated control information (e.g., downlink control information or sidelink control information); and/or (2) SRS offset indication may be a delta offset from the configured SRS offset for the SRS resource (or SRS resource set).

In a mode of operation, SRS offset may be implicitly determined based on one or more system and/or UE-specific parameters, wherein the system and/or UE-specific parameters may include at least one of identity (e.g., cell-id, UE-id, BWP-id), system configuration (e.g., subcarrier spacing, TDD UL/DL configuration, number of carriers, etc.), scheduling parameters (e.g., MCS, scheduled bandwidth, DM-RS pattern configured or indicated, etc.)

Mode of Operation Determination

In one embodiment, a mode of operation for an SRS trigger (e.g., SRS trigger mode) may be determined based on an uplink transmission mode used, selected, or determined. In various embodiments, an SRS trigger mode may be used to distinguish different modes of uplink transmissions, for example, between a single-user (SU) mode and a multi-user (MU) mode of uplink transmissions. In an example, a mode of operation for an SRS trigger may be applied with a scheme described herein depending on an SU/MU mode of operation. For example, an uplink transmission mode (e.g., SU/MU mode of uplink transmission) or an SRS trigger mode may be determined based on one or more of following:

DCI format used for an SRS trigger. For example, a first SRS trigger mode may be used when an SRS transmission is triggered in a first DCI format (e.g., DCI format 0_1) and a second SRS trigger mode may be used when an SRS transmission is triggered in a second DCI format (e.g., DCI format 1_1).

Number of DM-RS CDM group(s) without data indicated. For example, if an SRS transmission is triggered in a DCI (e.g., DCI format 0_1) in which the number of DMRS CDM group(s) without data is larger than a threshold.

The threshold may be different based on DMRS type, number of layers, and/or number of codewords.

DMRS type configured. For example, a first SRS trigger mode may be used when a first DMRS type is configured (e.g., DMRS type-1) for a UL transmission in the BWP; and a second SRS trigger mode may be used when a second DMRS type is configured (e.g., DMRS type-2) for a UE transmission in the BWP.

DMRS density configured. For example, a first SRS trigger mode may be used when the DMRS density (e.g., time density) is less than a threshold; and a second SRS trigger mode may be used when the DM-RS density is higher than or equal to the threshold.

DMRS density herein may be the number of DMRS symbols in a slot.

Maximum number of MIMO layer configured. For example, a first SRS trigger mode may be used when the maximum number of MIMO layer configured for a BWP is lower than a threshold; and a second SRS trigger mode may be used when the maximum number of MIMO layer configured for a BWP is equal to or higher than the threshold.

In one embodiment, an SRS trigger mode may be determined based on a configuration of the bandwidth part (BWP). For example, a first SRS trigger mode may be configured, used, or determined for a first BWP and a second SRS trigger mode may be configured, used, or determined for a second BWP. In some examples, an SRS trigger mode may be determined based on any of: an associated BWP-id, the number of SRS resources and/or SRS resource sets configured, the number of SRS antenna ports (e.g., maximum), and an SRS configuration for the BWP.

In one embodiment, an SRS trigger mode may be determined based on identity of the associated search space and/or CORESET. For example, the SRS trigger mode may be determined based on in which search space and/or CORESET the WTRU received the SRS trigger. If a UE received an SRS trigger in a first search space and/or CORESET (e.g., first search space identity or CORESET identity), the WTRU may use or determine a first SRS trigger mode; if the WTRU received an SRS trigger in a second search space and/or CORESET (e.g., second search space identity or CORESET identity), the WTRU may use or determine a second SRS trigger mode. In some cases, an SRS trigger mode may be configured for a search space and/or CORESET.

In one embodiment, an SRS trigger mode may be determined based on the number of bits configured for the SRS request field in a DCI. For example, if the number of bits for the SRS request field in a DCI is equal to or less than 2 bits, a first SRS trigger mode may be used or determined; otherwise, a second SRS trigger mode may be used. In some examples, when the SRS request bit field has more than 2 bits, the first two bits may be used to indicate the set of SRS resources triggered and the rest of bits may be used to indicate the SRS triggering offset value.

Enhanced Aperiodic SRS Transmission(s)

Figure 9:
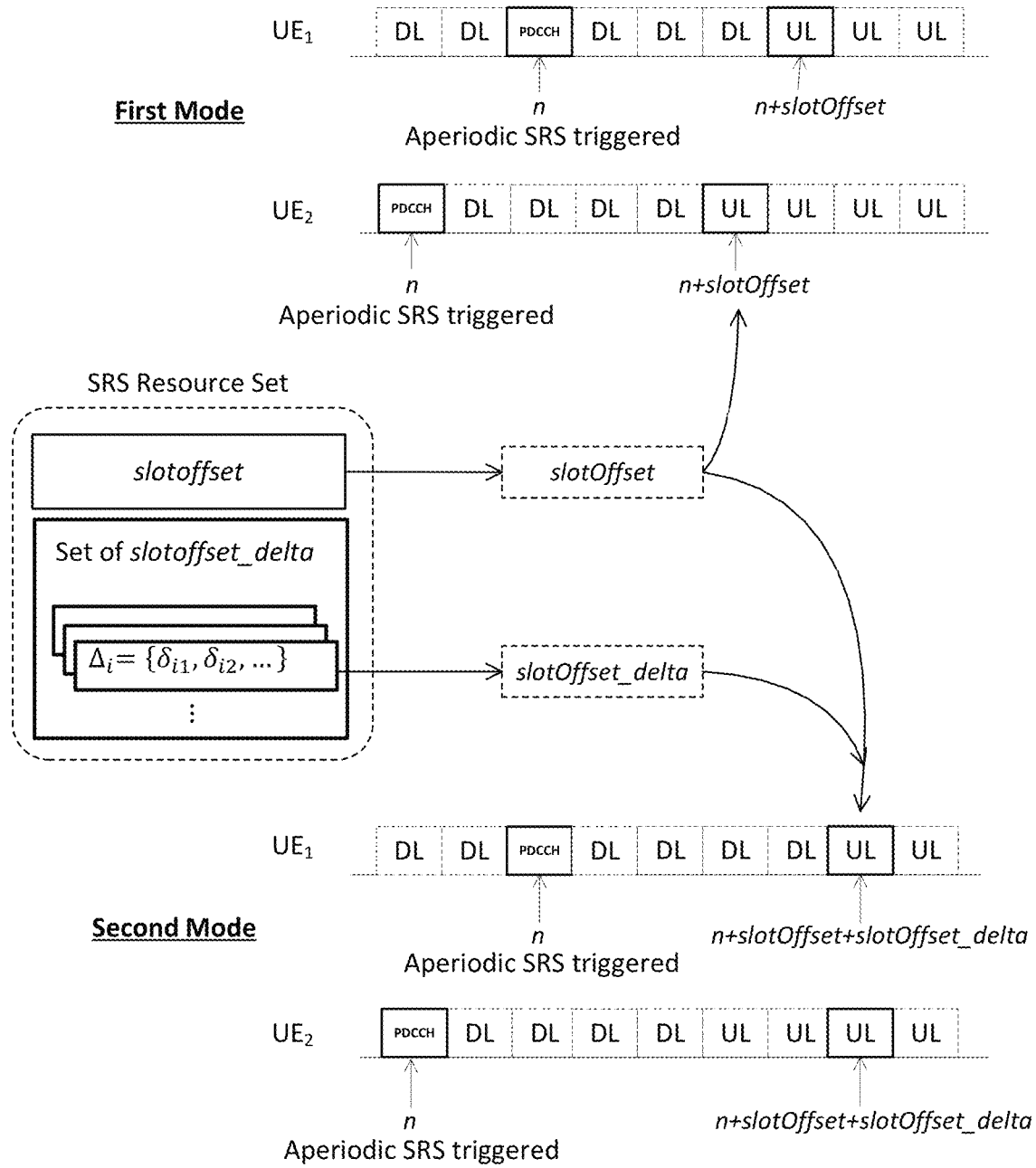
FIG. 9 is a slot diagram illustrating an example of a mechanism of mode determination for aperiodic SRS transmission(s), according to one or more embodiments.

In various embodiments, a WTRU may be indicated (or instructed) or configured to operate in one or more modes of aperiodic SRS transmission, for example, a legacy mode (e.g., a first mode in FIG. 9) and/or an enhanced mode (e.g., a second mode in FIG. 9). In some examples, a WTRU may be configured semi-statically or dynamically to operate in one mode of the one or more modes of aperiodic SRS transmission. For example, for a dynamic operation, a WTRU may be indicated explicitly by L1 signaling (e.g., by DCI) to the WTRU to operate in an enhanced mode. Additionally or alternatively, a WTRU may determine its mode of aperiodic SRS transmission implicitly.

In an example, referring to FIG. 9, a mechanism/procedure of mode determination for aperiodic SRS transmission(s) is provided. In this example, a WTRU may determine or select a mode of operation (or a mechanism/procedure) for aperiodic SRS transmission(s) based on (or using) explicit or implicit information.

In one embodiment, for SRS transmission (e.g., aperiodic SRS transmission), a WTRU may receive an SRS configuration of one or more SRS resource sets, and each SRS resource set is associated with a slot offset and/or a set of slot offset deltas. The WTRU may receive an SRS request/ indication in a DCI, and the SRS request may indicate an SRS resource set from the one or more SRS resource sets. The WTRU may determine a mode (or a scheme) for SRS transmission, for example, based on any combination of: 1) a Search Space or CORESET in which the DCI is received, 2) a DCI format, 3) an indication in the DCI, and/or 4) an RNTI used to scramble the DCI CRC.

In an example, when the WTRU determines to use a first SRS mode (e.g., a legacy mode, or the first mode in FIG. 9), the WTRU may determine (or select) one or more slots for SRS transmission(s) based on (or using) a slot offset associated with a respective SRS resource set. In another example, when the WTRU determines to use a second SRS mode (e.g., an enhanced mode, or the second mode in FIG. 9), the WTRU may determine (or select) at least one slot offset delta from the set of slot offset deltas associated with a respective SRS resource set. In some cases, the WTRU may determine (or select) the at least one slot offset delta based on a received indication (e.g., in the DCI discussed above, another DCI, or a MAC CE) or determined information (e.g., from an RNTI, such as the RNTI used to scramble the DCI CRC). The WTRU may determine a slot for an SRS transmission based on (or using) the slot offset (associated with the SRS resource set) plus the determined slot offset delta. The WTRU may, in the determined slot, transmit an SRS in one or more resources of the SRS resource set.

In various embodiments, method, apparatus, and/or systems for flexible aperiodic RS (e.g., SRS) transmissions in wireless communications are disclosed. In one embodiment, a method (e.g., implemented in WTRU 102) for wireless communications includes receiving configuration information of one or more SRS resource sets, each SRS resource set of the one or more SRS resource sets is associated with a slot offset and a set of slot offset deltas; receiving DCI indicating an SRS request, the SRS request indicates an SRS resource set of the one or more SRS resource sets; determining an SRS configuration from a set of SRS configurations for SRS transmissions; determining a slot for transmitting an SRS based on the determined SRS configuration; and transmitting, in the determined slot, the SRS using resources of the indicated SRS resource set.

In one embodiment, the SRS configuration is determined from the set of SRS configurations for the SRS transmissions based on any of: 1) a Search Space or CORESET in which the DCI is received, 2) a DCI format, 3) an indication in the DCI, and/or 4) a radio network temporary identifier (RNTI) used to scramble a cyclic redundancy check (CRC) for the DCI. In an example, the slot for transmitting the SRS is determined based on the slot offset associated with the indicated SRS resource set.

In one embodiment, the method may also include determining a slot offset delta from the set of slot offset deltas associated with the indicated SRS resource set, and the slot for transmitting the SRS is determined based on 1) the slot offset associated with the indicated SRS resource set, and 2) the determined slot offset delta. In an example, the slot offset delta is determined from the set of slot offset deltas based on any of: 1) the received configuration information, 2) the received DCI, 3) the determined SRS configuration, 4) a Search Space or CORESET in which the DCI is received, 5) a DCI format, 6) an indication in the DCI, 7) the RNTI used to scramble a cyclic redundancy check (CRC) for the DCI, or 8) an MAC CE. In one embodiment, the slot for transmitting the SRS is determined based on the slot offset associated with the SRS resource set plus the determined slot offset delta. In one embodiment, the configuration information of the one or more SRS resource sets is received via a radio resource control (RRC) signaling.

In one embodiment, a method (e.g., implemented in WTRU 102) for wireless communications includes receiving a first SRS configuration including a first slot information, receiving a second SRS configuration including a second slot information, and determining a slot index for an SRS transmission based on the first slot information and the second slot information. The method may also include transmitting an aperiodic SRS using the determined slot index. In an example, the first slot information comprises a slot offset value. In an example, the second slot information comprises one or more delta offset values, and the one or more delta offset values are used to correct the slot offset value. In an example, the method may include combining the slot offset value and the one or more delta offset values. In an example, the second SRS configuration is received via DCI or an MAC CE. In an example, at least one of the first SRS configuration and the second SRS configuration is a radio resource control (RRC) configuration.

In one embodiment, a method (e.g., implemented in WTRU 102) for wireless communications includes receiving a set of parameters for an SRS resource set, determining that an aperiodic SRS transmission is triggered based on DCI, and transmitting an aperiodic SRS based on the set of parameters. In an example, the aperiodic SRS transmission is triggered by a WTRU-specific DCI, a group common DCI, or an uplink DCI. In one embodiment, the method may include determining one or more slot offsets for the SRS resource set. In an example, the one or more slot offsets are determined based on one or more DCI formats.

In one embodiment, a method (e.g., implemented in WTRU 102) for wireless communications includes receiving an indication triggering an aperiodic RS transmission; determining, based on the indication, a slot and a new slot format for the aperiodic RS transmission, wherein the new slot format indicating a different slot format being used for the slot; and transmitting the aperiodic RS in the slot using the new slot format.

Slot Format Indication(s) for Aperiodic SRS Transmission(s)

In NR, for TDD operation, a WTRU may be configured (e.g., by higher layers) to operate with a specific pattern of uplink (UL), downlink (DL), and/or flexible (F) slots, and/or a specific pattern of UL, DL, and flexible (F) symbols per slot. For example, an RRC parameter tdd-UL-DL-Configuration Common provides a general pattern of slots within a preconfigured periodicity.

In various embodiments, a WTRU may be additionally provided a parameter tdd-UL-DL-ConfigurationDedicated to override flexible (F) symbols per slot over the number of slots indicated by tdd-UL-DL-ConfigurationCommon. For a set of symbols of a slot that are indicated as flexible by tdd-UL-DL-ConfigurationCommon, or tdd-UL-DL-ConfigurationDedicated, a WTRU may receive a DCI format 2_0 with an SFI-index field value that may indicate a new slot format [2].

In various embodiments, a WTRU may be configured to operate in an SFI_aperiodic mode. If the SFI_aperiodic mode is configured, for example, when the WTRU receives an L1 or L2 command triggering an aperiodic RS signal transmission, the received Information Element (IE) may also serve as a slot format indicator. In an example, the slot format indicator may be used to indicate/determine a change of format. For example, the WTRU may, based on information provided by the slot format indicator, change the format of the indicated slot for aperiodic RS transmission to another slot format required for the transmission of the RS.

In one embodiment, if the indicated slot for an UL (or DL) aperiodic RS transmission is already an UL (or DL) slot, the indicated slot format by the IE may only be an F type, and the indicated slot format (e.g., an F type) has a composition of UL, DL and/or F symbols.

In one embodiment, if the indicated slot for aperiodic RS transmission is an UL slot, the indicated slot type may be DL or F, and the new indicated DL or F slot format may override and replace the previous slot type with a new composition of UL, DL and/or F symbols. In another example, if the indicated slot for aperiodic RS transmission is a DL slot, the indicated slot type may be UL or F, and the new indicated UL or F slot format may override and replace the previous slot type with a new composition of UL, DL and/or F symbols.

In one embodiment, if the indicated slot for aperiodic SRS transmission is an F slot, the indicated slot type may be DL, UL or a F type (e.g., a new F type), where the new indicated DL, UL or F slot format may override and replace the previous slot type with a new composition of UL, DL and/or F symbols. For example, the WTRU may determine that the indicated slot for aperiodic SRS transmission is an F slot having a first F slot type, and the WTRU may determine that the indicated slot format is a DL slot type, a UL slot type, or a new F slot type (e.g., a second F slot type that is different from the first F slot type), where the newly indicated DL, UL or F slot format/type (e.g., a new composition of UL, DL and/or F symbols) may be used for the indicated slot for aperiodic SRS transmission.

In various embodiments, a WTRU may be configured to operate in an SFI_aperiodic mode. In an example, if the SFI_aperiodic mode is configured, when the WTRU receives an DCI triggering an aperiodic SRS transmission, the received DCI may also serve as a slot format indicator. In an example, the slot format indicator may be used to indicate/determine a change of format. For example, the WTRU may, based on information provided by the slot format indicator, change the format of the indicated slot for aperiodic SRS transmission to another slot format suitable for the transmission of the SRS. Therefore, the WTRU may not need to receive a separate DCI format (e.g., DCI format 2_0) to adapt the slot indicated for SRS transmission to a slot with UL transmission opportunity.

In one embodiment, if the indicated slot for an aperiodic SRS transmission is already an UL slot, the indicated slot format by the IE may only be an F type, and the indicated slot format (e.g., an F type) has a composition of UL, DL and/or F symbols.

In one embodiment, if the indicated slot for aperiodic RS transmission is an UL slot, the indicated slot type may be DL or F, and the new indicated DL or F slot format may override and replace the previous slot type with a new composition of UL, DL and/or F symbols. In another example, if the indicated slot for aperiodic RS transmission is a DL slot, the indicated slot type may be UL or F, and the new indicated UL or F slot format may override and replace the previous slot type with a new composition of UL, DL and/or F symbols.

In one embodiment, if the indicated slot for aperiodic SRS transmission is an F slot, the indicated slot type may be DL, UL or a F type (e.g., a new F type), where the new indicated DL, UL or F slot format may override and replace the previous slot type with a new composition of UL, DL and/or F symbols. For example, the WTRU may determine that the indicated slot for aperiodic SRS transmission is an F slot having a first F slot type, and the WTRU may determine that the indicated slot format is a DL slot type, a UL slot type, or a new F slot type (e.g., a second F slot type that is different from the first F slot type), where the newly indicated DL, UL or F slot format/type (e.g., a new composition of UL, DL and/or F symbols) may be used for the indicated slot for aperiodic SRS transmission.

In various embodiments, an IE that triggers an aperiodic RS transmission, may carry a field (e.g., an SFI-index) indicating a specific slot format. In one embodiment, to reduce overhead associated with the IE, instead of SFI-index, a WTRU may receive a new index (e.g., SFI_index_aperiodic) that may have a smaller size than an SFI_index. In an example, the new index (e.g., SFI_index_aperiodic) may select only a subset of slot format options from an original SFI table (e.g., shown in Ref. [2]).

In another embodiment, a WTRU may be configured (e.g., by higher layers) with one or more specific slot formats for an aperiodic RS transmission, and each configured slot format may correspond to a preferred slot format for the transmission, for example, UL, DL, or F. As such, when a WTRU receives an IE triggering an aperiodic RS transmission, the WTRU may use a specific slot format configured by higher layers.

Figure 10:
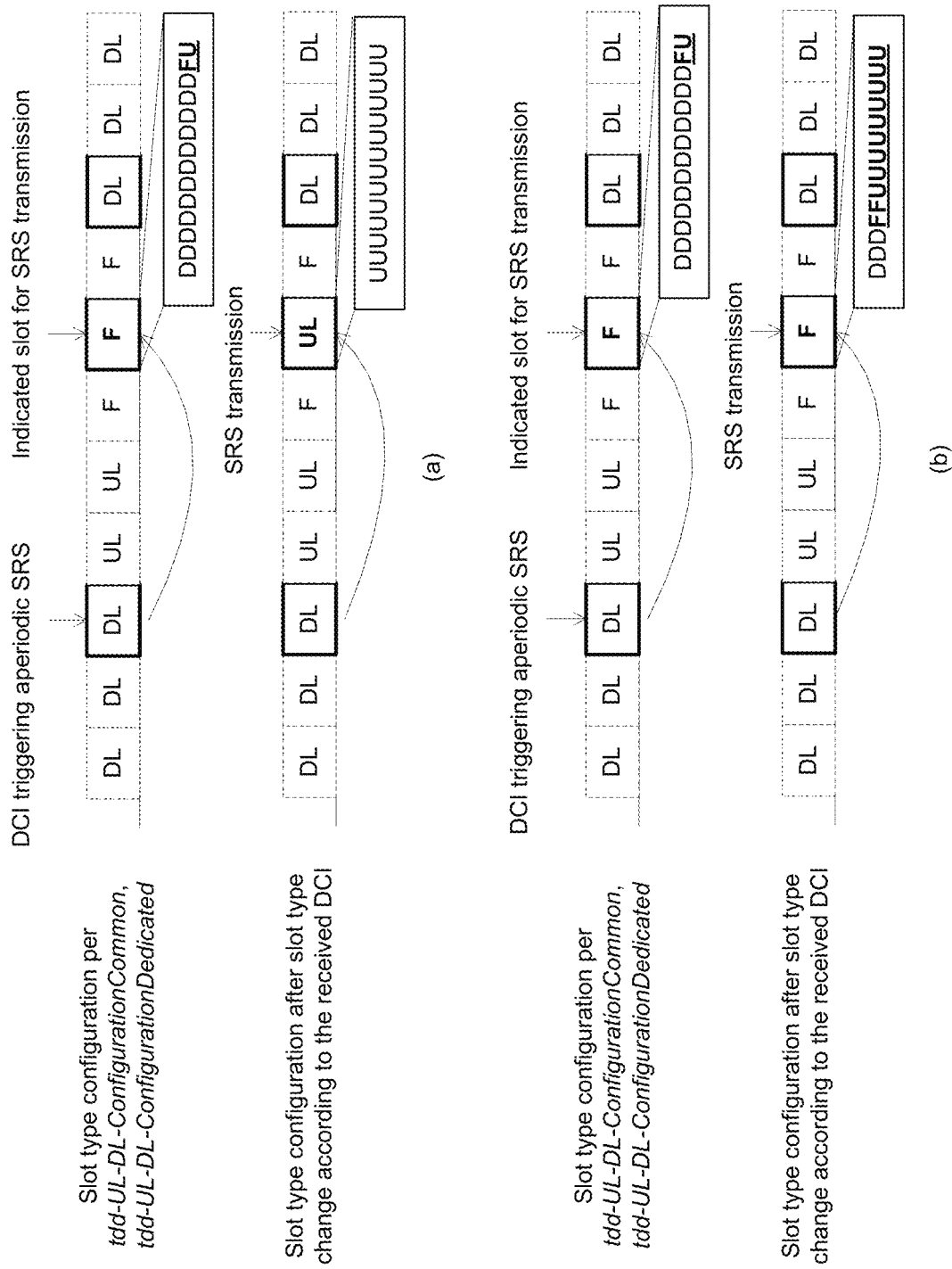
FIG. 10 is a slot diagram illustrating an example of mechanisms of using slot format indication(s) for aperiodic SRS transmission(s), according to one or more embodiments.

FIG. 10 illustrates examples of configuring a slot format indication by a triggering DCI for aperiodic SRS transmission(s). In some cases, even if an indicated slot for SRS transmission may be a flexible (F) slot with some symbols for allocated for an UL transmission, the indicated slot may still not have a sufficient number of symbols to accommodate the SRS transmissions. To accommodate SRS transmissions, the WTRU may receive, determine, or be configured with a slot format indication by a triggering DCI for aperiodic SRS transmission(s). Referring to FIG. 10, in an example as shown in FIG. 10 (a), the triggering DCI may change the slot type (e.g., from an F type with less UL symbols) to a full UL slot (e.g., having only UL symbols). In another example, as shown in FIG. 10 (b), the triggering DCI may change the slot format (e.g., a flexible format having less UL symbols) to another flexible format with more UL symbols.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM") or non-volatile (e.g., Read-Only Memory ("ROM") mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM") or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a wireless transmit/receive unit (WTRU) for wireless communications, the method comprising:
   receiving configuration information of one or more reference signal (RS) resource sets, wherein at least one RS resource set of the one or more RS resource sets is associated with a slot offset and a set of slot offset deltas;
   receiving downlink control information (DCI) indicating an RS request, wherein the RS request indicates the at least one RS resource set of the one or more RS resource sets;
   determining a slot offset delta from the set of slot offset deltas associated with the at least one RS resource set;
   determining, based on the slot offset delta and the slot offset associated with the at least one RS resource set, a slot for transmitting an RS; and
   transmitting the RS in the determined slot.

2. The method of claim 1, wherein the one or more RS resource sets comprise one or more sounding reference signal (SRS) resource sets.

3. The method of claim 1, wherein the slot offset delta from the set of slot offset deltas is determined based on any of: 1) the received configuration information, 2) the received DCI, 3) an RS configuration from a set of RS configurations for RS transmissions, 4) a search space or CORESET in which the DCI is received, 5) a DCI format, 6) an indication in the DCI, 7) a radio network temporary identifier (RNTI) used to scramble a cyclic redundancy check (CRC) for the DCI, or 8) a medium access control (MAC) Control Element (CE).

4. The method of claim 1, wherein the slot for transmitting the RS is determined further based on the slot offset associated with the at least one RS resource set plus the determined slot offset delta.

5. The method of claim 1, wherein the configuration information of the one or more RS resource sets is received via a radio resource control (RRC) signaling.

6. The method of claim 1, further comprising determining an RS configuration from a set of RS configurations for RS transmissions.

7. The method of claim 1, wherein each RS resource set of the one or more RS resource sets is associated with a respective slot offset and a respective set of slot offset deltas.

8. A wireless transmit/receive unit (WTRU) for wireless communications, comprising circuitry, including a processor, a transmitter, a receiver, and memory, the WTRU configured to:
receive configuration information of one or more reference signal (RS) resource sets, wherein at least one RS resource set of the one or more RS resource sets is associated with a slot offset and a set of slot offset deltas;
receive downlink control information (DCI) indicating an RS request, wherein the RS request indicates the at least one RS resource set of the one or more RS resource sets;
determine a slot offset delta from the set of slot offset deltas associated with the at least one RS resource set;
determine, based on the slot offset delta and the slot offset associated with the at least one RS resource set, a slot for transmitting an RS; and
transmit the RS in the determined slot.

9. The WTRU of claim 8, wherein the processor is further configured to determine an RS configuration from a set of RS configurations for RS transmissions.

10. The WTRU of claim 9, wherein the RS configuration is determined from the set of RS configurations for the RS transmissions based on any of: 1) a search space or CORESET in which the DCI is received, 2) a DCI format, 3) an indication in the DCI, or 4) a radio network temporary identifier (RNTI) used to scramble a cyclic redundancy check (CRC) for the DCI.

11. The WTRU of claim 8, wherein the one or more RS resource sets comprise one or more sounding reference signal (SRS) resource sets.

12. The WTRU of claim 8, wherein the slot offset delta from the set of slot offset deltas is determined based on any of: 1) the received configuration information, 2) the received DCI, 3) an RS configuration from a set of RS configurations for RS transmissions, 4) a search space or CORESET in which the DCI is received, 5) a DCI format, 6) an indication in the DCI, 7) a radio network temporary identifier (RNTI) used to scramble a cyclic redundancy check (CRC) for the DCI, or 8) a medium access control (MAC) Control Element (CE).

13. The WTRU of claim 8, wherein the slot for transmitting the RS is determined further based on the slot offset associated with the at least one RS resource set plus the determined slot offset delta.

14. The WTRU of claim 8, wherein the configuration information of the one or more RS resource sets is received via a radio resource control (RRC) signaling.

15. The WTRU of claim 8, wherein each RS resource set of the one or more RS resource sets is associated with a respective slot offset and a respective set of slot offset deltas.

16. The method of claim 6, wherein the RS configuration is determined from the set of RS configurations for the RS transmissions based on any of: 1) a search space or CORESET in which the DCI is received, 2) a DCI format, 3) an indication in the DCI, or 4) a radio network temporary identifier (RNTI) used to scramble a cyclic redundancy check (CRC) for the DCI.

* * * * *